US012544419B2

(12) United States Patent
Müller et al.

(10) Patent No.: US 12,544,419 B2
(45) **Date of Patent: *Feb. 10, 2026**

(54) TARGETED AMATOXIN CONJUGATE FOR THE TREATMENT OF SOLID TUMORS

(71) Applicant: Heidelberg Pharma Research GmbH, Ladenburg (DE)

(72) Inventors: Christoph Müller, Ladenburg (DE); Werner Simon, Ladenburg (DE); Christian Lutz, Ladenburg (DE); Susanne Werner-Simon, Ladenburg (DE); Torsten Hechler, Ladenburg (DE); Michael Kulke, Ladenburg (DE); Andreas Pahl, Ladenburg (DE)

(73) Assignee: Heidelberg Pharma Research GmbH, Ladenburg (DE)

( * ) Notice: Subject to any disclaimer, the term of this patent is extended or adjusted under 35 U.S.C. 154(b) by 1228 days.

This patent is subject to a terminal disclaimer.

(21) Appl. No.: 17/046,497

(22) PCT Filed: Apr. 12, 2019

(86) PCT No.: PCT/EP2019/059516

§ 371 (c)(1),
(2) Date: Oct. 9, 2020

(87) PCT Pub. No.: WO2019/197654

PCT Pub. Date: Oct. 17, 2019

(65) Prior Publication Data

US 2021/0077571 A1 Mar. 18, 2021

(30) Foreign Application Priority Data

Apr. 13, 2018 (EP) .................................... 18167265

(51) Int. Cl.

| | |
|---|---|
| *A61K 38/12* | (2006.01) |
| *A61K 47/65* | (2017.01) |
| *A61K 47/68* | (2017.01) |
| *A61P 35/00* | (2006.01) |

(52) U.S. Cl.

CPC .............. *A61K 38/12* (2013.01); *A61K 47/65* (2017.08); *A61K 47/6831* (2017.08); *A61K 47/6871* (2017.08); *A61P 35/00* (2018.01)

(58) Field of Classification Search

None

See application file for complete search history.

(56) References Cited

U.S. PATENT DOCUMENTS

| | | | | |
|---|---|---|---|---|
| 6,214,345 | B1 | 4/2001 | Firestone et al. | |
| 9,233,173 | B2 * | 1/2016 | Faulstich | A61K 47/6855 |
| 9,399,681 | B2 * | 7/2016 | Anderl | A61P 35/00 |
| 9,982,018 | B2 * | 5/2018 | Müller | A61P 35/00 |
| 10,842,882 | B2 * | 11/2020 | Anderl | A61K 47/6851 |
| 11,583,569 | B2 * | 2/2023 | Gallo | A61K 47/545 |
| 2022/0133902 | A1 | 5/2022 | Kulke et al. | |
| 2023/0135930 | A1 | 5/2023 | McDonagh et al. | |
| 2023/0355792 | A1 | 11/2023 | Kulke et al. | |
| 2024/0165257 | A1 | 5/2024 | Hechler et al. | |
| 2024/0307549 | A1 | 9/2024 | Kulke et al. | |

FOREIGN PATENT DOCUMENTS

| | | | | |
|---|---|---|---|---|
| EP | 2 363 486 | 9/2011 | | |
| EP | 3 130 587 | 2/2017 | | |
| WO | WO 2012/041504 A1 | 4/2012 | | |
| WO | WO 2014/043403 A1 | 3/2014 | | |
| WO | WO-2014135282 A1 * | 9/2014 | | A61K 47/50 |
| WO | WO 2016/142049 A1 | 9/2016 | | |
| WO | WO 2017/149077 A1 | 9/2017 | | |
| WO | WO 2017/210288 A1 | 12/2017 | | |
| WO | WO 2018/115466 A1 | 6/2018 | | |
| WO | WO 2019/030173 A1 | 2/2019 | | |
| WO | WO 2019/057964 A1 | 3/2019 | | |

OTHER PUBLICATIONS

Heckler et al. ("Amanitin-based antibody-drug conjugates targeting the prostate-specific membrane antigen PSMA," published on www.heidelberg-pharma.com in Apr. 2014) (Year: 2014).*

European Patent Office, International Search Report in International Patent Application No. PCT/EP2019/059516 (Jul. 30, 2019).

European Patent Office, Written Opinion in International Patent Application No. PCT/EP2019/059516 (Jul. 30, 2019).

Japan Patent Office, Office Action in Japanese Patent Application No. 2020-555908 (Jul. 11, 2023).

Japan Patent Office, Pre-Appeal Report in Japanese Patent Application No. 2020-555908 (Jan. 4, 2024).

Japan Patent Office, Notice of Reasons for Refusal in Japanese Patent Application No. 2020-555908 (Nov. 8, 2022).

Edelman et al., "The Covalent Structure of an entire γG Immunoglobulin Molecule", Proc. N. A. S., vol. 63, Mar. 21, 1969, pp. 78-85.

Junutula et al., "Site-specific conjugation of a cytotoxic drug to an antibody improves the therapeutic index", Nature Biotechnology, vol. 26, No. 8, Aug. 2008, pp. 925-932.

(Continued)

*Primary Examiner* — Christina Bradley

(74) *Attorney, Agent, or Firm* — Grüneberg and Myers PLLC

(57) ABSTRACT

The present invention relates to an amatoxin-linker construct comprising an amatoxin according to formula (I) wherein: $R_1$ and $R_2$ are each —OH, R3 is $NH_2$, or a linker which carries a reactive group Y for linking said amatoxin to a target-binding moiety, $R_4$ is H or a linker which carries a reactive group Y for linking said amatoxin to a target-binding moiety, $R_5$ is absent or =O, wherein R3 and R4 cannot be the same, for use in the manufacture of a binding moiety-toxin conjugate for the treatment of a solid tumor, and a respective binding moiety-toxin conjugate for the treatment of a solid tumor.

7 Claims, 12 Drawing Sheets

Specification includes a Sequence Listing.

(56) References Cited

OTHER PUBLICATIONS

Lüttgau et al., "Immunotherapy of B-Cell Lymphoma with an Engineered Bispecific Antibody Targeting CD19 and CD5", Antibodies, vol. 2, May 14, 2013, pp. 338-352.
European Patent Office, Communication Pursuant to Article 94(3) EPC in European Patent Application No. 19716909.7 (Mar. 13, 2024).
M. Cochet-Meilhac, et al., "Animal DNA-Dependent RNA Polymerases", 12. Determination of the Cellular Number of RNA Polymerase B Molecules, Biochimica et Biophysica Acta, 353, 1974, pp. 185-192.
M. Cochet-Meilhac, et al., "Animal DNA-Dependent RNA Polymerases", 11. Mechanism of the Inhibition of RNA polymerases B by Amatoxins, Biochimica et Biophysica Acta, 353, 1974, pp. 160-184.

* cited by examiner

SEQUENCE LISTING

```
<160> NUMBER OF SEQ ID NOS: 12

<210> SEQ ID NO 1
<211> LENGTH: 7
<212> TYPE: PRT
<213> ORGANISM: Artificial Sequence
<220> FEATURE:
<223> OTHER INFORMATION: >3F11-VH-1 CDR H1

<400> SEQUENCE: 1

Gly Tyr Thr Phe Thr Tyr Phe
1               5

<210> SEQ ID NO 2
<211> LENGTH: 17
<212> TYPE: PRT
<213> ORGANISM: Artificial Sequence
<220> FEATURE:
<223> OTHER INFORMATION: >3F11-VH-1 CDR H2

<400> SEQUENCE: 2

Gly Ile Ser Pro Gly Asp Gly Asn Thr Asn Tyr Asn Glu Asn Phe Lys
1               5                   10                  15

Gly

<210> SEQ ID NO 3
<211> LENGTH: 11
<212> TYPE: PRT
<213> ORGANISM: Artificial Sequence
<220> FEATURE:
<223> OTHER INFORMATION: >3F11-VH-1 CDR H3

<400> SEQUENCE: 3

Asp Gly Asn Phe Pro Tyr Tyr Ala Met Asp Ser
1               5                   10

<210> SEQ ID NO 4
<211> LENGTH: 16
<212> TYPE: PRT
<213> ORGANISM: Artificial Sequence
<220> FEATURE:
<223> OTHER INFORMATION: >3F11-VL-1 CDR L1

<400> SEQUENCE: 4

Arg Ser Ser Gln Ser Leu Val His Ser Asn Gly Asn Thr Tyr Leu His
```

-continued 1 5 10 15

<210> SEQ ID NO 5
<211> LENGTH: 7
<212> TYPE: PRT
<213> ORGANISM: Artificial Sequence
<220> FEATURE:
<223> OTHER INFORMATION: >3F11-VL-1 CDR L2

<400> SEQUENCE: 5

Thr Val Ser Asn Arg Phe Ser
1 5

<210> SEQ ID NO 6
<211> LENGTH: 8
<212> TYPE: PRT
<213> ORGANISM: Artificial Sequence
<220> FEATURE:
<223> OTHER INFORMATION: >3F11-VL-1 CDR L3

<400> SEQUENCE: 6

Ser Gln Ser Thr His Val Pro Thr
1 5

<210> SEQ ID NO 7
<211> LENGTH: 214
<212> TYPE: PRT
<213> ORGANISM: Artificial Sequence
<220> FEATURE:
<223> OTHER INFORMATION: >Anti-HER2 Light Chain

<400> SEQUENCE: 7

Asp Ile Gln Met Thr Gln Ser Pro Ser Ser Leu Ser Ala Ser Val Gly
1 5 10 15

Asp Arg Val Thr Ile Thr Cys Arg Ala Ser Gln Asp Val Asn Thr Ala
20 25 30

Val Ala Trp Tyr Gln Gln Lys Pro Gly Lys Ala Pro Lys Leu Leu Ile
35 40 45

Tyr Ser Ala Ser Phe Leu Tyr Ser Gly Val Pro Ser Arg Phe Ser Gly
50 55 60

Ser Arg Ser Gly Thr Asp Phe Thr Leu Thr Ile Ser Ser Leu Gln Pro
65 70 75 80

Glu Asp Phe Ala Thr Tyr Tyr Cys Gln Gln His Tyr Thr Thr Pro Pro
85 90 95

Thr Phe Gly Gln Gly Thr Lys Val Glu Ile Lys Arg Thr Val Ala Ala
100 105 110

Pro Ser Val Phe Ile Phe Pro Pro Ser Asp Glu Gln Leu Lys Ser Gly
115 120 125

Thr Ala Ser Val Val Cys Leu Leu Asn Asn Phe Tyr Pro Arg Glu Ala
130 135 140

Lys Val Gln Trp Lys Val Asp Asn Ala Leu Gln Ser Gly Asn Ser Gln
145 150 155 160

Glu Ser Val Thr Glu Gln Asp Ser Lys Asp Ser Thr Tyr Ser Leu Ser
165 170 175

Ser Thr Leu Thr Leu Ser Lys Ala Asp Tyr Glu Lys His Lys Val Tyr
180 185 190

Ala Cys Glu Val Thr His Gln Gly Leu Ser Ser Pro Val Thr Lys Ser
195 200 205

Phe Asn Arg Gly Glu Cys
210

-continued

<210> SEQ ID NO 8
<211> LENGTH: 450
<212> TYPE: PRT
<213> ORGANISM: Artificial Sequence
<220> FEATURE:
<223> OTHER INFORMATION: >Anti-HER2 Heavy Chain

<400> SEQUENCE: 8

```
Glu Val Gln Leu Val Glu Ser Gly Gly Gly Leu Val Gln Pro Gly Gly
1               5                   10                  15

Ser Leu Arg Leu Ser Cys Ala Ala Ser Gly Phe Asn Ile Lys Asp Thr
            20                  25                  30

Tyr Ile His Trp Val Arg Gln Ala Pro Gly Lys Gly Leu Glu Trp Val
        35                  40                  45

Ala Arg Ile Tyr Pro Thr Asn Gly Tyr Thr Arg Tyr Ala Asp Ser Val
    50                  55                  60

Lys Gly Arg Phe Thr Ile Ser Ala Asp Thr Ser Lys Asn Thr Ala Tyr
65                  70                  75                  80

Leu Gln Met Asn Ser Leu Arg Ala Glu Asp Thr Ala Val Tyr Tyr Cys
                85                  90                  95

Ser Arg Trp Gly Gly Asp Gly Phe Tyr Ala Met Asp Tyr Trp Gly Gln
            100                 105                 110

Gly Thr Leu Val Thr Val Ser Ser Ala Ser Thr Lys Gly Pro Ser Val
        115                 120                 125

Phe Pro Leu Ala Pro Ser Ser Lys Ser Thr Ser Gly Gly Thr Ala Ala
    130                 135                 140

Leu Gly Cys Leu Val Lys Asp Tyr Phe Pro Glu Pro Val Thr Val Ser
145                 150                 155                 160

Trp Asn Ser Gly Ala Leu Thr Ser Gly Val His Thr Phe Pro Ala Val
                165                 170                 175

Leu Gln Ser Ser Gly Leu Tyr Ser Leu Ser Ser Val Val Thr Val Pro
            180                 185                 190

Ser Ser Ser Leu Gly Thr Gln Thr Tyr Ile Cys Asn Val Asn His Lys
        195                 200                 205

Pro Ser Asn Thr Lys Val Asp Lys Lys Val Glu Pro Lys Ser Cys Asp
    210                 215                 220

Lys Thr His Thr Cys Pro Pro Cys Pro Ala Pro Glu Leu Leu Gly Gly
225                 230                 235                 240

Pro Ser Val Phe Leu Phe Pro Pro Lys Pro Lys Asp Thr Leu Met Ile
                245                 250                 255

Ser Arg Thr Pro Glu Val Thr Cys Val Val Val Cys Val Ser His Glu
            260                 265                 270

Asp Pro Glu Val Lys Phe Asn Trp Tyr Val Asp Gly Val Glu Val His
        275                 280                 285

Asn Ala Lys Thr Lys Pro Arg Glu Glu Gln Tyr Asn Ser Thr Tyr Arg
    290                 295                 300

Val Val Ser Val Leu Thr Val Leu His Gln Asp Trp Leu Asn Gly Lys
305                 310                 315                 320

Glu Tyr Lys Cys Lys Val Ser Asn Lys Ala Leu Pro Ala Pro Ile Glu
                325                 330                 335

Lys Thr Ile Ser Lys Ala Lys Gly Gln Pro Arg Glu Pro Gln Val Tyr
            340                 345                 350

Thr Leu Pro Pro Ser Arg Glu Glu Met Thr Lys Asn Gln Val Ser Leu
        355                 360                 365
```

Thr Cys Leu Val Lys Gly Phe Tyr Pro Ser Asp Ile Ala Val Glu Trp
    370                 375                 380

Glu Ser Asn Gly Gln Pro Glu Asn Asn Tyr Lys Thr Thr Pro Pro Val
385                 390                 395                 400

Leu Asp Ser Asp Gly Ser Phe Phe Leu Tyr Ser Lys Leu Thr Val Asp
                405                 410                 415

Lys Ser Arg Trp Gln Gln Gly Asn Val Phe Ser Cys Ser Val Met His
            420                 425                 430

Glu Ala Leu His Asn His Tyr Thr Gln Lys Ser Leu Ser Leu Ser Pro
        435                 440                 445

Gly Lys
    450

<210> SEQ ID NO 9
<211> LENGTH: 219
<212> TYPE: PRT
<213> ORGANISM: Artificial Sequence
<220> FEATURE:
<223> OTHER INFORMATION: >chiBCE19 Light Chain

<400> SEQUENCE: 9

Asp Ile Val Met Thr Gln Ala Ala Pro Ser Ile Pro Val Thr Pro Gly
1               5                   10                  15

Glu Ser Val Ser Ile Ser Cys Arg Ser Ser Lys Ser Leu Leu Asn Ser
            20                  25                  30

Asn Gly Asn Thr Tyr Leu Tyr Trp Phe Leu Gln Arg Pro Gly Gln Ser
        35                  40                  45

Pro Gln Leu Leu Ile Tyr Arg Met Ser Asn Leu Ala Ser Gly Val Pro
    50                  55                  60

Asp Arg Phe Ser Gly Ser Gly Ser Gly Thr Ala Phe Thr Leu Arg Ile
65                  70                  75                  80

Ser Arg Val Glu Ala Glu Asp Val Gly Val Tyr Tyr Cys Met Gln His
                85                  90                  95

Leu Glu Tyr Pro Leu Thr Phe Gly Ala Gly Thr Lys Leu Glu Leu Lys
            100                 105                 110

Arg Thr Val Ala Ala Pro Ser Val Phe Ile Phe Pro Pro Ser Asp Glu
        115                 120                 125

Gln Leu Lys Ser Gly Thr Ala Ser Val Val Cys Leu Leu Asn Asn Phe
    130                 135                 140

Tyr Pro Arg Glu Ala Lys Val Gln Trp Lys Val Asp Asn Ala Leu Gln
145                 150                 155                 160

Ser Gly Asn Ser Gln Glu Ser Val Thr Glu Gln Asp Ser Lys Asp Ser
                165                 170                 175

Thr Tyr Ser Leu Ser Ser Thr Leu Thr Leu Ser Lys Ala Asp Tyr Glu
            180                 185                 190

Lys His Lys Val Tyr Ala Cys Glu Val Thr His Gln Gly Leu Ser Ser
        195                 200                 205

Pro Val Thr Lys Ser Phe Asn Arg Gly Glu Cys
    210                 215

<210> SEQ ID NO 10
<211> LENGTH: 451
<212> TYPE: PRT
<213> ORGANISM: Artificial Sequence
<220> FEATURE:
<223> OTHER INFORMATION: >chiBCE19 Heavy Chain -continued

<400> SEQUENCE: 10

```
Glu Val Gln Leu Gln Gln Ser Gly Pro Glu Leu Ile Lys Pro Gly Ala
1               5                   10                  15

Ser Val Lys Met Ser Cys Lys Ala Ser Gly Tyr Thr Phe Thr Ser Tyr
            20                  25                  30

Val Met His Trp Val Lys Gln Lys Pro Gly Gln Gly Leu Glu Trp Ile
        35                  40                  45

Gly Tyr Ile Asn Pro Tyr Asn Asp Gly Thr Lys Tyr Asn Glu Lys Phe
    50                  55                  60

Lys Gly Lys Ala Thr Leu Thr Ser Asp Lys Ser Ser Ser Thr Ala Tyr
65                  70                  75                  80

Met Glu Leu Ser Ser Leu Thr Ser Glu Asp Ser Ala Val Tyr Tyr Cys
                85                  90                  95

Ala Arg Gly Thr Tyr Tyr Tyr Gly Ser Arg Val Phe Asp Tyr Trp Gly
            100                 105                 110

Gln Gly Thr Thr Leu Thr Val Ser Ser Ala Ser Thr Lys Gly Pro Ser
        115                 120                 125

Val Phe Pro Leu Ala Pro Ser Ser Lys Ser Thr Ser Gly Gly Thr Ala
    130                 135                 140

Ala Leu Gly Cys Leu Val Lys Asp Tyr Phe Pro Glu Pro Val Thr Val
145                 150                 155                 160

Ser Trp Asn Ser Gly Ala Leu Thr Ser Gly Val His Thr Phe Pro Ala
                165                 170                 175

Val Leu Gln Ser Ser Gly Leu Tyr Ser Leu Ser Ser Val Val Thr Val
            180                 185                 190

Pro Ser Ser Ser Leu Gly Thr Gln Thr Tyr Ile Cys Asn Val Asn His
        195                 200                 205

Lys Pro Ser Asn Thr Lys Val Asp Lys Lys Val Glu Pro Lys Ser Cys
    210                 215                 220

Asp Lys Thr His Thr Cys Pro Pro Cys Pro Ala Pro Glu Leu Leu Gly
225                 230                 235                 240

Gly Pro Ser Val Phe Leu Phe Pro Pro Lys Pro Lys Asp Thr Leu Met
                245                 250                 255

Ile Ser Arg Thr Pro Glu Val Thr Cys Val Val Val Cys Val Ser His
            260                 265                 270

Glu Asp Pro Glu Val Lys Phe Asn Trp Tyr Val Asp Gly Val Glu Val
        275                 280                 285

His Asn Ala Lys Thr Lys Pro Arg Glu Glu Gln Tyr Asn Ser Thr Tyr
    290                 295                 300

Arg Val Val Ser Val Leu Thr Val Leu His Gln Asp Trp Leu Asn Gly
305                 310                 315                 320

Lys Glu Tyr Lys Cys Lys Val Ser Asn Lys Ala Leu Pro Ala Pro Ile
                325                 330                 335

Glu Lys Thr Ile Ser Lys Ala Lys Gly Gln Pro Arg Glu Pro Gln Val
            340                 345                 350

Tyr Thr Leu Pro Pro Ser Arg Glu Glu Met Thr Lys Asn Gln Val Ser
        355                 360                 365

Leu Thr Cys Leu Val Lys Gly Phe Tyr Pro Ser Asp Ile Ala Val Glu
    370                 375                 380

Trp Glu Ser Asn Gly Gln Pro Glu Asn Asn Tyr Lys Thr Thr Pro Pro
385                 390                 395                 400

Val Leu Asp Ser Asp Gly Ser Phe Phe Leu Tyr Ser Lys Leu Thr Val
                405                 410                 415
```

-continued

Asp Lys Ser Arg Trp Gln Gln Gly Asn Val Phe Ser Cys Ser Val Met
420 425 430

His Glu Ala Leu His Asn His Tyr Thr Gln Lys Ser Leu Ser Leu Ser
435 440 445

Pro Gly Lys
450

<210> SEQ ID NO 11
<211> LENGTH: 6
<212> TYPE: PRT
<213> ORGANISM: Artificial Sequence
<220> FEATURE:
<223> OTHER INFORMATION: >Linker 1 Sequence

<400> SEQUENCE: 11

Phe Lys Gly Pro Leu Gly
1 5

<210> SEQ ID NO 12
<211> LENGTH: 4
<212> TYPE: PRT
<213> ORGANISM: Artificial Sequence
<220> FEATURE:
<223> OTHER INFORMATION: >Linker 2 Sequence

<400> SEQUENCE: 12

Ala Ala Pro Val
1

TARGETED AMATOXIN CONJUGATE FOR THE TREATMENT OF SOLID TUMORS

CROSS-REFERENCE TO RELATED APPLICATIONS

This patent application is the U.S. national phase of International Patent Application No. PCT/EP2019/059516, filed on Apr. 12, 2019, which claims the benefit of European Patent Application No. 18167265.0, filed on Apr. 13, 2018, which are incorporated by reference in their entireties herein.

INCORPORATION-BY-REFERENCE OF MATERIAL ELECTRONICALLY SUBMITTED

Incorporated by reference in its entirety herein is a computer-readable nucleotide/amino acid sequence listing submitted concurrently herewith and identified as follows: 13,699 bytes ASCII (Text) file named “750839_ST25.txt,” created Sep. 30, 2020.

FIELD OF THE INVENTION

The present application relates to targeted amatoxin conjugates for the treatment of solid tumors.

BACKGROUND

The treatment of solid tumors is an ongoing challenge, with little advancements over the last decades. While quite a few new treatment modalities have been developed recently, there is still a need for further improvements, to increase survival rates of patients suffering from solid tumors, and improve their quality of life.

One promising treatment modality are antibody drug conjugates, where a highly toxic entity that has the capacity of killing cells is coupled to a target binding entity that shuttles the toxin to a site of disease.

The applicant has, in the past developed so called ATACs, i.e., Antibody Targeted Amanitin Conjugates, where an amanitin toxin is coupled to a highly target specific antibody. Amanitins are bicyclic peptides of eight amino acids that occur, naturally, in several species of the *Amanita* genus of mushrooms, one being the death cap (*Amanita phalloides*). Amanitins have the following general structure:

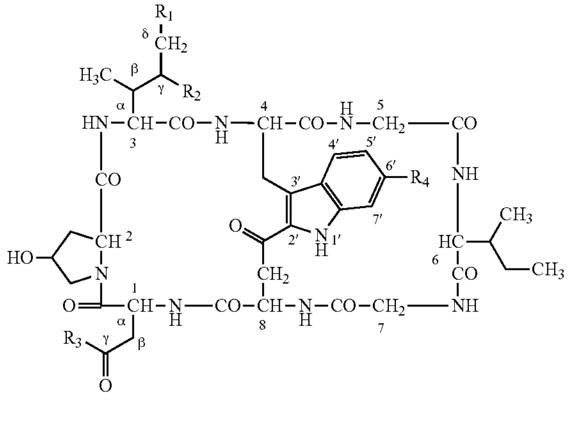

| | $R_1$ | $R_2$ | $R_3$ | $R_4$ |
|---|---|---|---|---|
| α-amanitin | OH | OH | $NH_2$ | OH |
| β-amanitin | OH | OH | OH | OH |

-continued

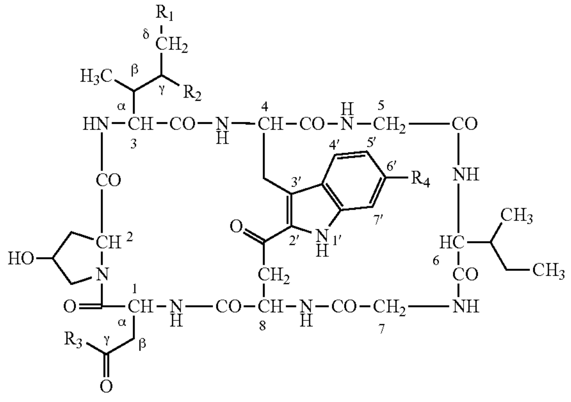

| | $R_1$ | $R_2$ | $R_3$ | $R_4$ |
|---|---|---|---|---|
| γ-amanitin | H | OH | $NH_2$ | OH |
| ε-amanitin | H | OH | OH | OH |
| amanin | OH | OH | OH | H |
| amaninamide | OH | OH | $NH_2$ | H |
| amanullin | H | H | $NH_2$ | OH |
| amanullinic acid | H | H | OH | OH |

Amatoxins bind to RNA polymerase II with very high affinity resulting in a dramatic decrease in protein synthesis and ultimately in apoptosis in both dividing and resting cells (Cochet-Meilhac and Chambon 1974; Cochet-Meilhac et al. 1974). Alpha-amanitin only slightly binds to RNA polymerase III and shows no binding to RNA polymerase I. When bound to RNA polymerase II, amanitins inhibit the translocation of the enzyme on the RNA and DNA and thus transcription rate is slowed down by over 1000fold finally resulting in apoptosis of the cell.

One ATAC that is currently under development is called HDP 101, and is disclosed in PCT application PCT/EP2017/084431. It comprises an amatoxin with an amino acid 4 with a 6'-deoxy position (=R4 in the above figure); and an amino acid 8 with a S-deoxy position. The linker is a PAB Val Ala Linker.

This amatoxin is conjugated, via amino acid 1 and a cleavable linker conjugated thereto, to an anti BCMA-binding antibody called J22.9-ISY. The structure of the amatoxin linker conjugate used in HDP101 is called 30.2115, and shown in a table herein below.

This ATAC has shown very good efficacy in the treatment of hematologic malignancies, in particular of lymphoma. Such hematologic malignancies are called herein “liquid tumors” as well.

However, the applicants have realized that there is still room for improvement in the treatment of solid tumors, which represent a more challenging target for ATACa than liquid tumors.

It is hence one object of the present invention to provide new treatment options of solid tumors. It is one further object of the present invention to improve the efficacy of ATACs in solid tumors.

These and further objects are met with methods and means according to the independent claims of the present invention. The dependent claims are related to specific embodiments.

SUMMARY OF THE INVENTION

The present invention provides targeted amatoxin conjugates for the treatment of solid tumors. The invention and general advantages of its features will be discussed in detail below.

BRIEF DESCRIPTION OF THE FIGURES

The following list gives an overview of the Figures and their content:

| Figure | Parameter | Model | Antibody | Toxin variant |
|---|---|---|---|---|
| Fig. 1 | Cell viability | JIMT cell line | Anti Her2 | 6OH-Trp + Trp |
| Fig. 2A | Tumor volume | JIMT xenograft | Anti Her2 | 6OH-Trp |
| Fig. 2B | Tumor volume | JIMT xenograft | Anti Her2 | Trp |
| Fig. 3 | Cell viability | LnCAP cell line | Anti PSMA | 6OH-Trp + Trp |
| Fig. 4A | Tumor volume | LnCAP xenograft | Anti PSMA | 6OH-Trp |
| Fig. 4B | Tumor volume | LnCAP xenograft | Anti PSMA | 6OH-Trp |
| Fig. 4C | Tumor volume | LnCAP xenograft | Anti PSMA | Trp |
| Fig. 5 | Cell viability | Raji cell line | Anti CD19 | 6OH-Trp + Trp |
| Fig. 6A | Survival (Kaplan Meier) | Raji iv xenograft (liquid tumor) | Anti CD19 | 6OH-Trp + Trp |
| Fig. 6B | Survival (Kaplan Meier) | Nalm-6 iv xenograft (liquid tumor) | Anti CD19 | 6OH-Trp + Trp |
| Fig. 7A | Tumor volume | Raji sc xenograft (solid tumor) | Anti CD19 | 6OH-Trp |
| Fig. 7B | Tumor volume | Raji sc xenograft (solid tumor) | Anti CD19 | Trp | herein is for purposes of describing particular embodiments only, and is not intended to be limiting. It must be noted that, as used in the specification and the appended claims, the singular forms "a", "an", and "the" include singular and/or plural referents unless the context clearly dictates otherwise. It is moreover to be understood that, in case parameter ranges are given which are delimited by numeric values, the ranges are deemed to include these limitation values.

Figure 1:
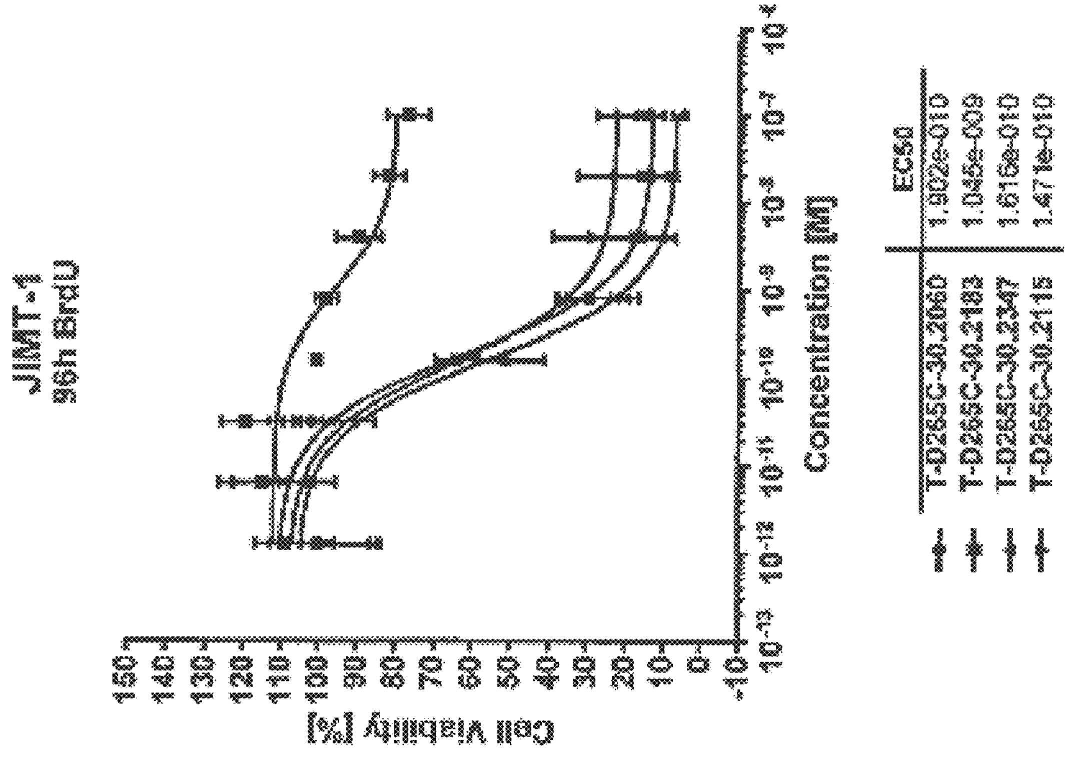
Figure 1:
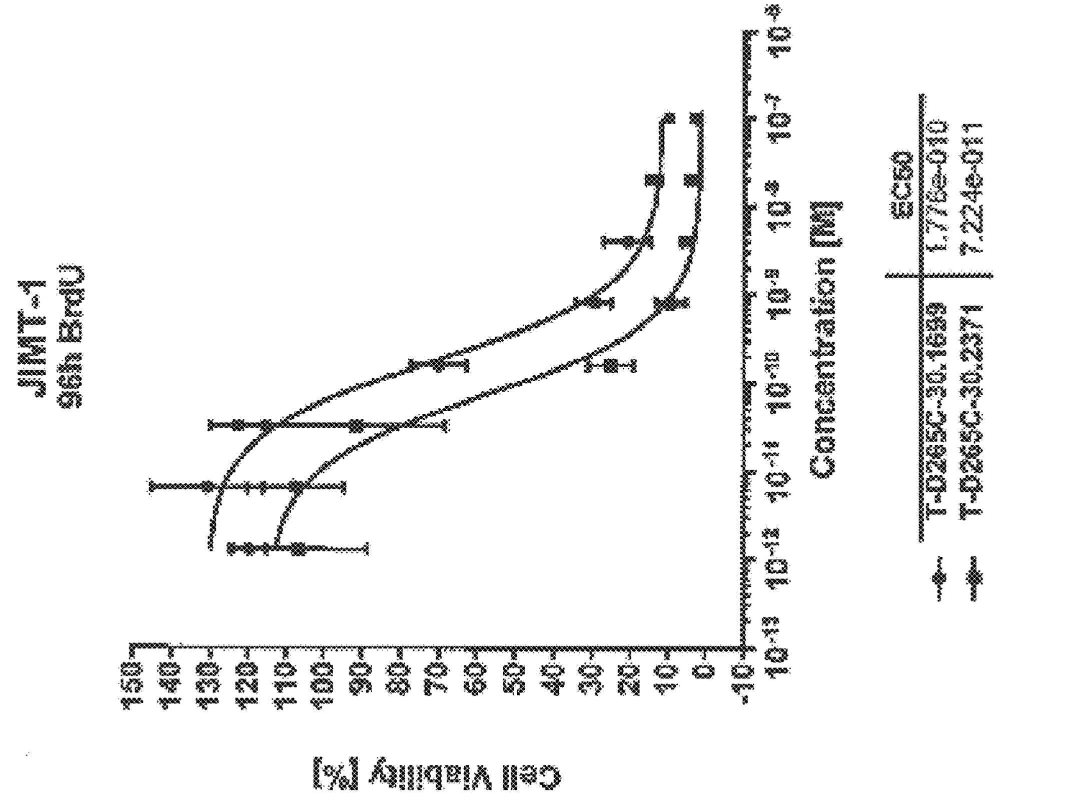

It is further to be understood that embodiments disclosed herein are not meant to be understood as individual embodiments which would not relate to one another. Features discussed with one embodiment are meant to be disclosed also in connection with other embodiments shown herein. If, in one case, a specific feature is not disclosed with one embodiment, but with another, the skilled person would understand that does not necessarily mean that said feature is not meant to be disclosed with said other embodiment. The skilled person would understand that it is the gist of this application to disclose said feature also for the other embodiment, but that just for purposes of clarity and to keep the specification in a manageable volume this has not been done.

Furthermore, the content of the prior art documents referred to herein is incorporated by reference. This refers, particularly, for prior art documents that disclose standard or routine methods. In that case, the incorporation by reference has mainly the purpose to provide sufficient enabling disclosure, and avoid lengthy repetitions.

According to a first aspect, an amatoxin-linker construct comprising an amatoxin according to formula (I)

formula (I)

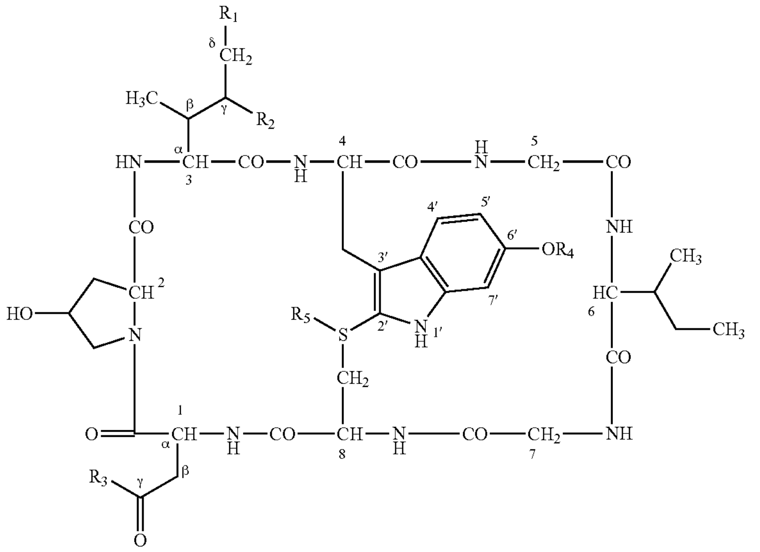

DETAILED DESCRIPTION OF THE INVENTION

Before the invention is described in detail, it is to be understood that this invention is not limited to the particular component parts of the devices described or process steps of the methods described as such devices and methods may vary. It is also to be understood that the terminology used is provided, wherein:

$R_1$ and $R_2$ are each —OH $R_3$ is $NH_2$, or a linker which carries a reactive group Y for linking said amatoxin to a target-binding moiety, $R_4$ is H or a linker which carries a reactive group Y for linking said amatoxin to a target-binding moiety, $R_5$ is absent or =O, wherein $R_3$ and $R_4$ cannot be the same.

Said construct is provided for use in the manufacture of a binding moiety-toxin conjugate for the treatment of a solid tumor.

One of the key features of these constructs is the —$OR_4$ substituent on position 4 in the indole ring of amino acid 4 (Trp) of the molecule.

The inventors have surprisingly shown that binding moiety-toxin conjugates comprising such amatoxin linker constructs have superior potency against solid tumors, or cells comprised therein. This is especially true when compared to structurally similar binding moiety-toxin conjugates which do not have the —$OR_4$ on position 4, but have a hydrogen substituent instead. Interestingly, no such obvious difference can be observed in the treatment of liquid tumors, were both variants have a comparable potency, as disclosed in PCT application PCT/EP2017/084431.

The term "solid tumor", as used herein, relates to all cancer types affecting body tissue or organs, with the exception of the blood, bone marrow and lymphatic system.

The term "liquid tumor", as used herein, relates to any cancer or malignancy that occurs in the fluid of a patient's body, for instance blood, bone marrow or lymph, including leukemia, lymphoma and myeloma.

It is important to understand that —$OR_4$ can either be —OH, or —O-linker. In particular, if the linker is a cleavable linker or a self immolative linker, the linker will degrade over time, and the final step of immolation will result in the hydrolysis of the —O-linker bond, hence releasing an —OH. For this reason, the cleavage/immolation will deliver a 6-OH-Trp.

According to one embodiment, the linker is a cleavable linker and/or a self immolative linker.

The term "cleavable linker", as used herein, relates to a linker that is typically susceptible to cleavage under intracellular conditions. Suitable cleavable linkers include, for example, a peptide linker cleavable by an intracellular protease, such as lysosomal protease or an endosomal protease. In exemplary embodiments, the linker can be a dipeptide linker, such as a valine-citrulline (val-cit), a valine-alanine (val-ala), a phenylalanine-lysine (phe-lys) linker, or maleimidocapronic "valine-citruline-p-aminobenzyloxycarbonyl (mc-Val-Cit-PABA) linker. Such linkers are e.g. disclosed in U.S. Pat. No. 6,214,345.

Another linker is Sulfosuccinimidyl-44N-maleimidomethyl]cyclohexane-1-carboxylate (smcc). Sulfo-smcc conjugation occurs via a maleimide group which reacts with sulfhydryls (thiols, —SH), while its Sulfo-NHS ester is reactive toward primary amines (as found in Lysine and the protein or peptide N-terminus). Yet another linker is maleimidocaproyl (mc). Other suitable linkers include linkers hydrolyzable at a specific pH or a pH range, such as a hydrazone linker. Additional suitable cleavable linkers include disulfide linkers. The linker may be covalently bound to the antibody to such an extent that the antibody must be degraded intracellularly in order for the drug to be released e.g. the me linker and the like. Other pH sensitive cleavable linkers that comprise a cyclic benzylidene acetal linker are disclosed in EP3130587.

The term "self immolative linker", as used herein, relates to a linker which degrades spontaneously after an initial reaction has taken place. One example of a self-immolative linker is p-aminobenzyl alcohol (PAB), which is often conjugated to a cleavable dipeptide, like valine-citrulline (val-cit), or valine-alanine (val-ala), via the aromatic amine group and via a carbamate group to a primary or secondary amine of the toxin. Cleavage of the dipeptide by a suitable protease triggers a 1,6-elimination of of PAB and carbon dioxide in PAB and concomitant release of the free toxin. The p-aminobenzyl moiety can also be coupled directly by alkylation to an amino-, hydroxy- or phenol-group of the toxin. Cleavage of the dipeptide results then by 1,6-elimination to fragmentation of the benzylamine or benzylether bond with concomitant release of the toxin.

Other protease triggers for this PAB based self-immolative systems are exemplified but not limited to, by the glycine-proline-leucine-glycine (gly-pro-leu-gly) motive, cleavable by matrix metalloproteases (MMP II) or the alanine-alanine-proline-valine (ala-ala-pro-val) motive, cleavable by elastase.

Another example of self-immolative linker is represented by beta-glycosides of p-hydroxybenzl alcohol with glucuronic acid. Toxins can be conjugated to the benzylic carbon atom by the above-mentioned groups and a target binding moiety via the meta-position of the aromatic ring. Upon cleavage of the glyosidic bond by beta-glucuronidase the toxin is liberated by an 1,6-elimination process.

According to one embodiment, the linker is cleavable by at least one agent selected from the group consisting of Cysteine protease Metallo protease Serine protease Threonine protease Aspartic protease Cysteine proteases, also known as thiol proteases, are enzymes that degrade proteins. These proteases share a common catalytic mechanism that involves a nucleophilic cysteine thiol in a catalytic triad or dyad. Cysteine proteases are commonly encountered in fruits including the *papaya*, pineapple, fig and kiwifruit.

The MEROPS protease classification systemhas Cysteine proteases under C. Metalloproteases are protease enzymes whose catalytic mechanism involves a metal. Most metalloproteases require zinc, but some use cobalt. The metal ion is coordinated to the protein via three ligands.

The ligands co-ordinating the metal ion can vary with histidine, glutamate, aspartate, lysine, and arginine. The fourth coordination position is taken up by a labile water molecule.

Serine proteases are enzymes that cleave peptide bonds in proteins, in which serine serves as the nucleophilic amino acid at the (enzyme's) active site. They are found ubiquitously in both eukaryotes and prokaryotes. Serine proteases fall into two broad categories based on their structure: chymotrypsin-like (trypsin-like) or subtilisin-like.

The MEROPS protease classification system has Cysteine proteases under S.

Threonine proteases are a family of proteolytic enzymes harbouring a threonine (Thr) residue within the active site. The prototype members of this class of enzymes are the catalytic subunits of the proteasome, however the acyltransferases convergently evolved the same active site geometry and mechanism.

Aspartic proteases are a catalytic type of protease enzymes that use an activated water molecule bound to one or more aspartate residues for catalysis of their peptide substrates. In general, they have two highly conserved aspartates in the active site and are optimally active at acidic pH. Nearly all known aspartyl proteases are inhibited by pepstatin. The MEROPS protease classification system has Cysteine proteases under A.

In particular embodiments the linker is cleavable by at least one agent selected from the group consisting of Cathepsin A or B Matrix metalloproteinases (MMPs)

Elastase

Beta-glucuronidase

Beta-galactosidase

According to one further embodiment, the linker the linker comprises a motif selected from the group consisting of Val Ala Val Cit Val Lys Val Arg Phe Lys Gly Pro Leu Gly (SEQ ID NO: 11)

Ala Ala Pro Val (SEQ ID NO: 12)

Beta-glucuronide

Beta-galactoside

According to one further embodiment, the reactive group Y in the linker is at least one selected from the group consisting of:

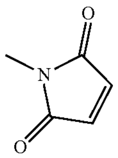

maleimide

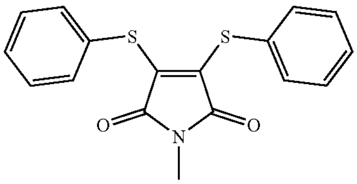

3,4-diphenylthio-maleimide

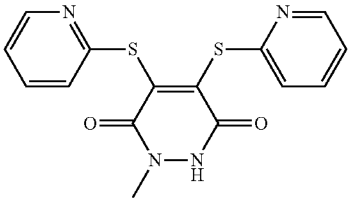

4,5-bis(2-pyridinyl-sulfanyl)-1,2-dihydropyridazine-3,6-dione

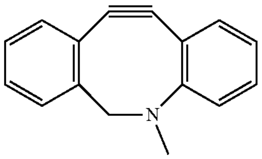

DBCO

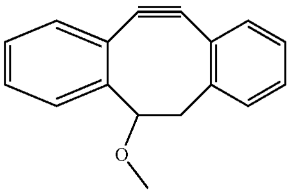

DIBO

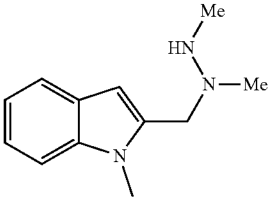

HIPS

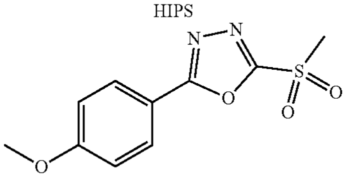

2-(4-hydroxyphenyl)-5-(methylsulfonyl)-1,3,4-oxadiazole

-continued

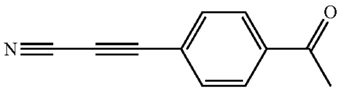

APN

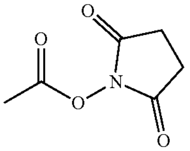

Succinimide

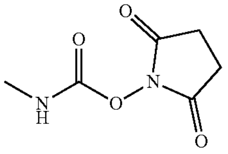

Succinimidylcarbamates

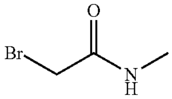

Bromoacetamide

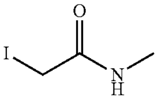

Iodoacetamide

According to one further embodiment, the linker comprises a para Aminobenzol Val Ala maleimidopropyl motif.

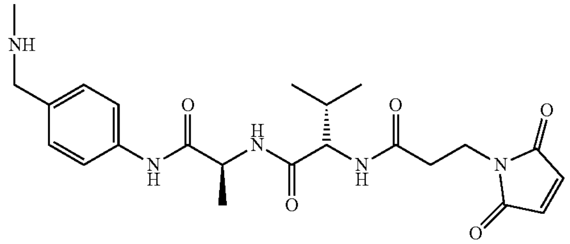

According to one further embodiment, the linker in the amatoxin-linker construct is a non-cleavable linker. The terms "stable linker" and "non-cleavable linker" are used interchangeably herein.

Typically, non-cleavable linkers release the drug after the binding moiety, i.e., the monoclonal antibody to which the toxin linker construct is conjugated, is degraded intracellularly, e.g., in the lysosomes. A typical non cleavable linker is the maleimide alkane linker:

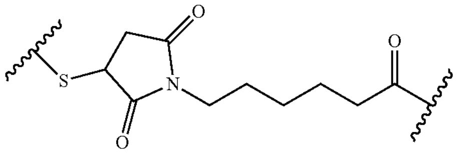 [SMILES: *SC1CC(=O)N(CCCCCC(*)=O)C1=O]

Another typical non-cleavable linker is the SMCC linker as used in Ado-trastuzumab Emtansine (T-DM1)

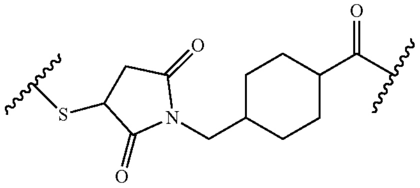 [SMILES: *SC1CC(=O)N(CC2CCC(C(*)=O)CC2)C1=O]

In one embodiment, $R_3$ is not a non-cleavable linker. In another embodiment, $R_3$ is a cleavable linker, preferably a self immolative linker. In another embodiment, $R_4$ is a non cleavable, a cleavable or a self immolative linker.

According to one further embodiment, the amatoxin-linker construct has a formula selected from the group consisting of:
a)
HDP 30.2060
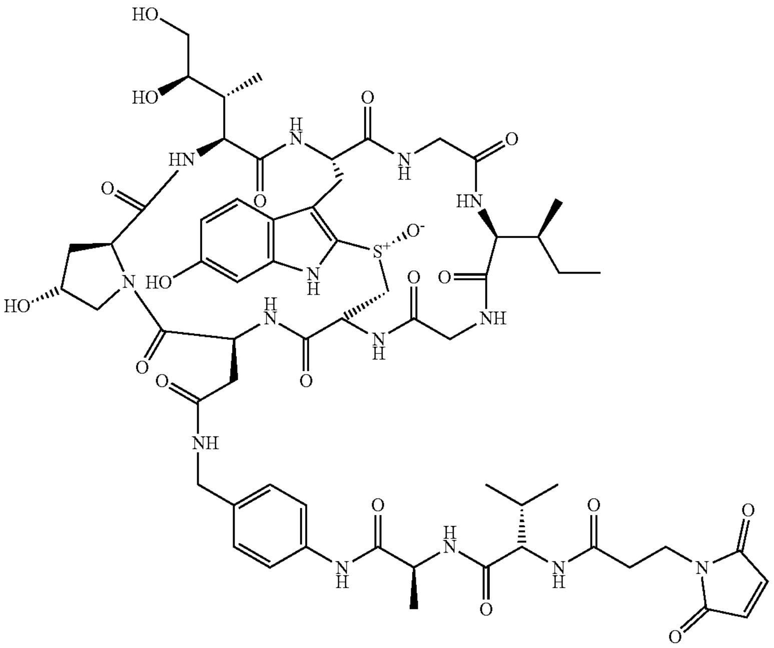
b)
HDP 30.2347
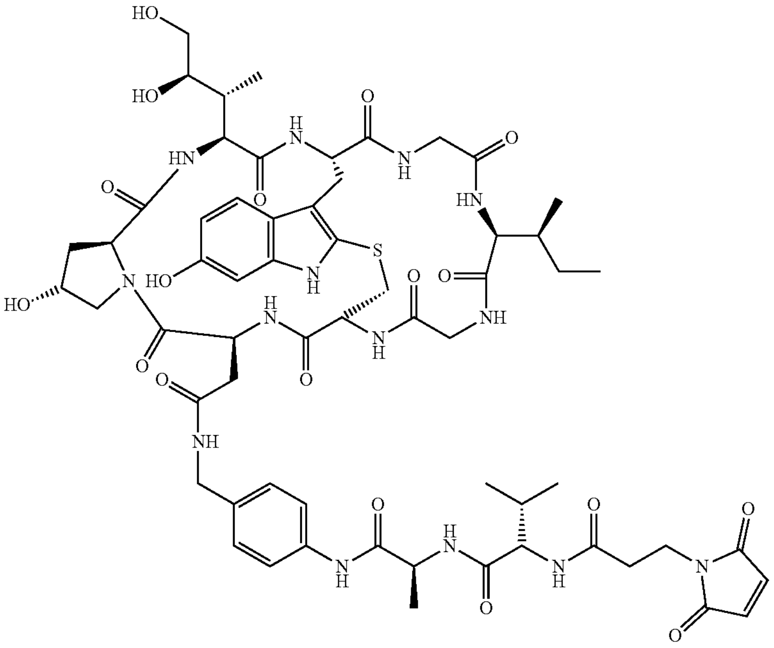

-continued c)

HDP 30.1699

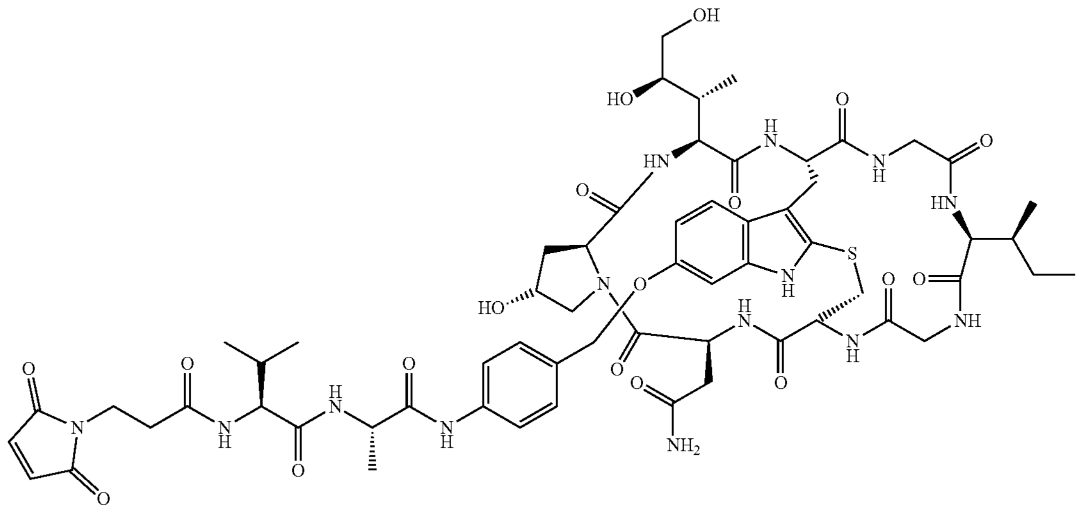

d)

HDP 30.2371

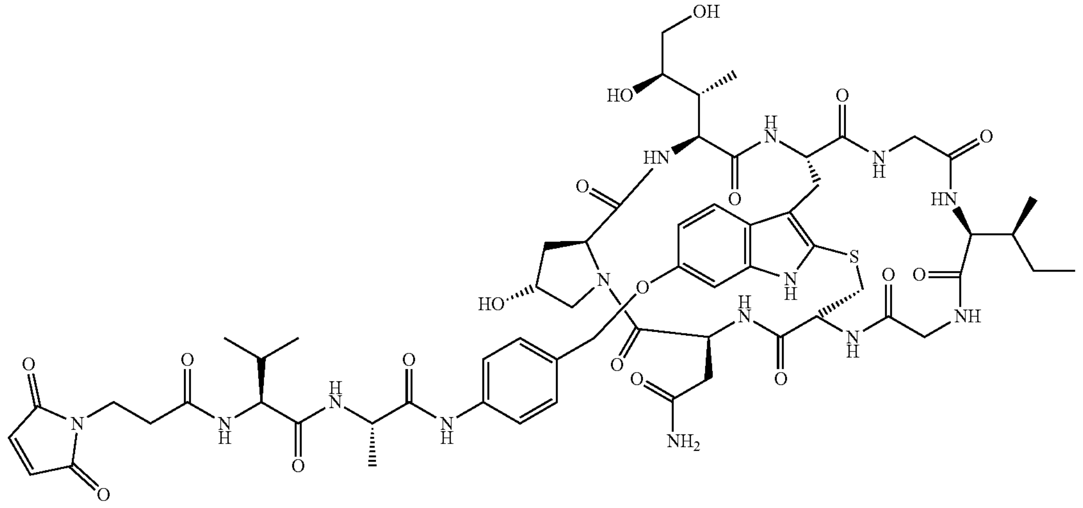

Table 1: Some Molecular Characteristics of these Four Amatoxin-Linker Constructs.

TABLE 1

Some molecular characteristics of these four amatoxin-linker constructs.

| Applicant's identifier | Trp | Sulfur bridge | Linker at | R4 | R3 | Linker |
|---|---|---|---|---|---|---|
| 30.1699 | 6-Hyd-Trp | sulfoxide | aa4 | Linker | H | p-Amino-Benzyl |
| 30.2371 | 6-Hyd-Trp | thioether | aa4 | Linker | H | Ala Val |
| 30.2060 | 6-Hyd-Trp | sulfoxide | aa1 | H | Linker | maleimidopropyl |
| 30.2347 | 6-Hyd-Trp | thioether | aa1 | H | Linker | |

According to one further embodiment, the amatoxin-linker construct which is provided for use in the manufacture of a binding moiety-toxin conjugate for the treatment of a solid tumor, wherein said solid tumor is resistant to a binding moiety-toxin conjugate whose amatoxin does not comprise an —$OR_4$ substituent at 6'-position of the indol.

According to another aspect of the invention, a binding moiety-toxin conjugate is provided, said conjugate for use in the treatment of a human or animal subject being (i) diagnosed for, (ii) suffering from or (iii) being at risk of developing a solid tumor, which conjugate comprises (a) the amatoxin-linker construct of the above description, and (b) a target-binding moiety; and wherein the linker links said amatoxin and said target-binding moiety.

According to another aspect of the invention, such binding moiety-toxin conjugate is provided for use in manufacture of a medicament for the treatment of a human or animal subject being (i) diagnosed for, (ii) suffering from or (iii) being at risk of developing a solid tumor.

According to another aspect of the invention, a method for treating or preventing a solid tumor is provided, said method comprising administering to a subject in need thereof an effective amount of such binding moiety-toxin conjugate.

According to one embodiment of the invention, the target-binding moiety is an antibody, antibody fragment, antibody-based binding protein, or an antibody mimetic, all of which retain target binding properties.

An "antibody", as used herein, is preferably a monoclonal antibody. As used herein, the term "monoclonal antibody (mAb)", shall refer to an antibody composition having a homogenous antibody population, i.e., a homogeneous population consisting of a whole immunoglobulin, or a fragment or derivative thereof retaining target binding capacities. Particularly preferred, such antibody is selected from the group consisting of IgG, IgD, IgE, IgA and/or IgM, or a fragment or derivative thereof retaining target binding capacities.

As used herein, the term "antibody fragment" shall refer to fragments of such antibody retaining target binding capacities, e.g.

- a CDR (complementarity determining region)
- a hypervariable region,
- a variable domain (Fv)
- an IgG heavy chain (consisting of VH, CH1, hinge, CH2 and CH3 regions)
- an IgG light chain (consisting of VL and CL regions), and/or
- a Fab and/or $F(ab)_2$.

Other embodiments encompass Camelid Antibodies, Shark antibodies, heavy chain portion of a Fab(Fd) fragment, which consists of the VH and CH1 domains; a variable fragment (Fv) fragment; a domain antibody (dAb) fragment, which comprises a single variable domain, a single chain FvFragment (scFv); (viii) a diabody; a linear antibody, which comprises a pair of tandem Fvsegments (VH-CH1-VH-CH1) which, together with complementarity light chain polypeptides, form a pair of antigen binding regions; and other non-full length portions of immunoglobulin heavy and/or light chains, or mutants, variants, or derivatives thereof, alone or in any combination, An antibody based binding protein as used herein comprises at least one antibody-derived VH, VL, or CH immunoglobulin domain in the context of other non-immunoglobulin, or non-antibody derived components, An antibody mimetic, as used herein, is an organic compound that, like antibodies, can specifically bind antigens, but is not structurally related to antibodies. This definition encompasses, for example, Ankyrin Repeat Proteins, C-Type Lectins, A-domain proteins of *S. aureus*, Transferrins, Lipocalins, 10th type III domains of fibronectin, Kunitz domain protease inhibitors, Ubiquitin derived binders, Gamma Crystallin derived binders, Cysteine knots or knottins, thioredoxin A scaffold based binders, nucleic acid aptamers, Artificial Antibodies produced by molecular imprinting of polymers, Peptide libraries from bacterial genomes, SH-3 domains, Stradobodies, "A domains" of membrane receptors stabilised by disulfide bonds and Ca2+, CTLA4-based compounds, Fyn SH3, and Aptamers.

According to one embodiment, said target-binding moiety binds at least one target selected from the group consisting of

- Her2, and/or
- PSMA.

According to one embodiment of the invention, said target-binding moiety is at least one antibody selected from the group consisting of

- Trastuzumab, and/or
- h3/F11.

The inventors saw that tumor cells, such as Raji or Raji-Luc, grow, when applied subcutaneously, as homogeneous solid tumors with defined structure and connective tissue. These subcutaneously implanted tumor cells are indicative for solid tumors since important properties of solid tumors are given such as penetration hindrance and diffusion hindrance. Besides, subcutaneous models in general are prerequisites for the preclinical development of new drugs intended for the treatment of cancer.

When injected intravenously, however, Raji or Raji-Luc develop the phenotype of a liquid tumor, e.g., a leukemia. For this reason, Raji or Raji-Luc are a suitable model to show the different effects of the claimed toxin linker conjugates in treatment of solid vs liquid tumors.

The CDR sequences of antibody h3/F11 are disclosed in EP2363486, the content of which is incorporated by reference herein.

According to one embodiment of the invention, the solid tumor is at least one selected from the group consisting of

- a) sarcoma,
- b) blastoma, and/or
- c) carcinoma.

According to one embodiment of the invention, said solid tumor is resistant to a binding moiety-toxin conjugate whose amatoxin does not comprise an $—OR_4$ substituent at 6'-position of the indol.

According to one embodiment of the invention, the antibody or fragment or derivative thereof comprises an engineered cysteine residue.

In one embodiment, the linker is conjugated to the free SH group of said cysteine. Because cysteine is artificially introduced into the amino acid sequence of the antibody, use thereof as a conjugation site does not affect the formation of intra- and interchain disulfide bridges of the antibody, hence leaving its stability unaffected.

Preferably, such cysteine is introduced into the constant domain of the antibody, to not affect target binding of the latter. The principles of this conjugation method, are disclosed in Junutula et al (2008), the content of which is incorporated herein by reference.

According to one embodiment of the invention said cysteine residue is selected from the group consisting of heavy chain 118Cys, heavy chain 239Cys, and heavy chain 265Cys, according to the EU numbering system according to Edelman et al., Proc. Natl. Acad. Sci. USA; 63 (1969) 78-85.

The antibodies used in the present experiments comprise a D265C substitution in both Fc domains, in order to provide a cysteine residue that has such free SH groups. The respective technology is disclosed in WO2016142049 A1 assigned to the present applicant, the content of which is incorporated herein by reference, and delivers a homogenous product with a fixed drug to antibody ration ("DAR") of 2 and a site specific conjugation.

The inventors have further shown that using D265C as a conjugation has the additional effect that, because D265 is involved in in the binding interaction of the antibody Fc region to one or more Fc[gamma] receptors, resulting in impaired binding to one or more Fc[gamma] receptors. Such antibody, or antibody amatoxin conjugate, may exhibit reduced immunomodulatory responses (like ADCC, ADCP and/or CDC responses, which are evoked by antibody binding to Fc[gamma] receptors) in the subject, and can hence contribute to reduce unwanted side effects.

According to one embodiment of the invention, the conjugate is provided for use in the treatment of a human or animal subject being (i) diagnosed for, (ii) suffering from or (iii) being at risk of developing a solid tumor, wherein said solid tumor is resistant to a binding moiety-toxin conjugate whose amatoxin does not comprise an —$OR_4$ substituent at 6'-position of the indol.

According to one further aspect of the invention, a pharmaceutical composition for use in the treatment of a human or animal subject being (i) diagnosed for, (ii) suffering from or (iii) being at risk of developing a solid tumor is provided, which composition comprises the binding moiety-toxin conjugate as discussed above.

According to another aspect of the invention, such composition is provided for use in manufacture of a medicament for the treatment of a human or animal subject being (i) diagnosed for, (ii) suffering from or (iii) being at risk of developing a solid tumor.

According to another aspect of the invention, a method for treating or preventing a solid tumor is provided, said method comprising administering to a subject in need thereof an effective amount of such composition.

Examples

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope.

All amino acid sequences disclosed herein are shown from N-terminus to C-terminus; all nucleic acid sequences disclosed herein are shown 5'→3'.

Materials and Methods

1. Amatoxin Linker Conjugates

In the experiments described herein, four targeted amatoxin linker conjugates are used which fall under the scope of the invention, meaning that they have a 6-OH Trp residue, either unconjugated or conjugated to a linker, as referred to under $R_4$ in formula (i).

Further, two targeted amatoxin linker conjugates are used which do not fall under the scope of the invention because they comprise a Trp lacking the 6-OR substituent. These molecules are being used as a benchmark to demonstrate the potency increase the claimed constructs and conjugates in the treatment of solid tumors.

The six amatoxin linker conjugates used in the present studies are shown in the following:

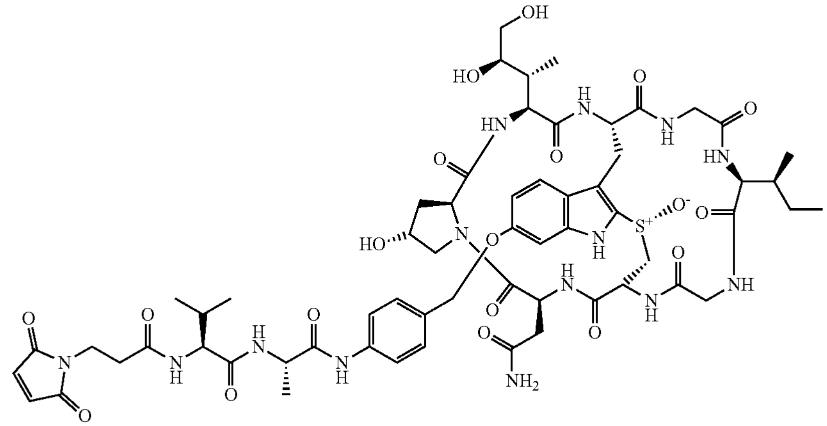

HDP 30.1699 6-OH Trp Sulfoxide Linker at aa4 according to invention

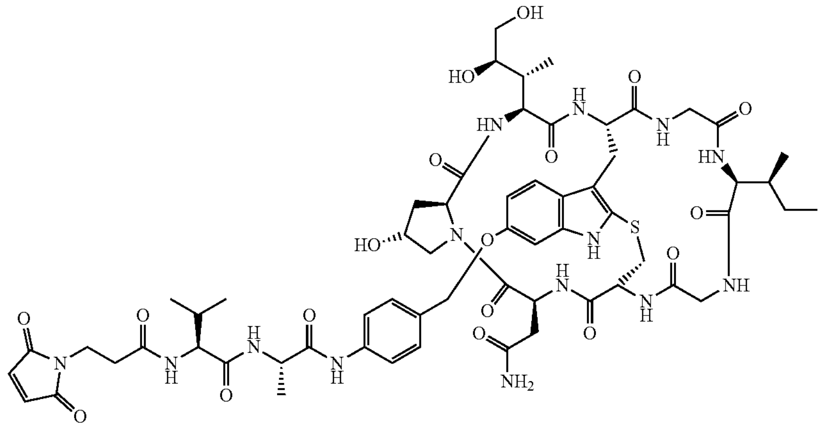

HDP 30.2371 6-OH Trp thioether Linker at aa4 according to invention

-continued
| | | | |
|---|---|---|---|
| 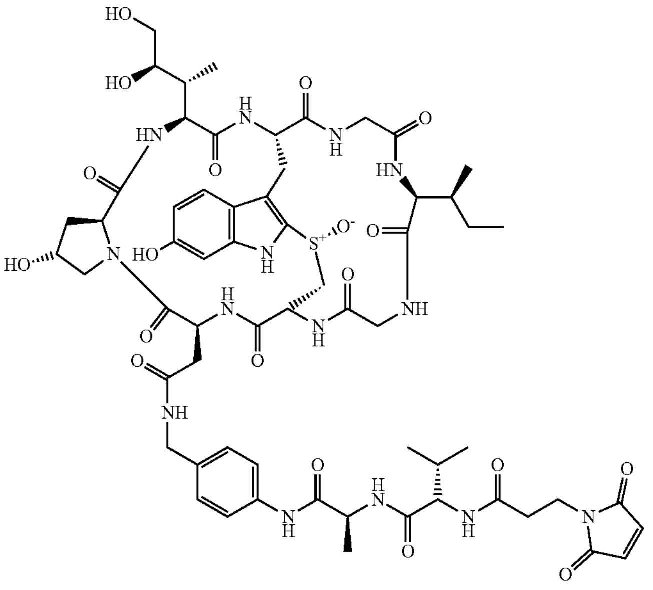 | HDP 30.2060 | 6-OH Trp Sulfoxide Linker at aa1 | according to invention |
| 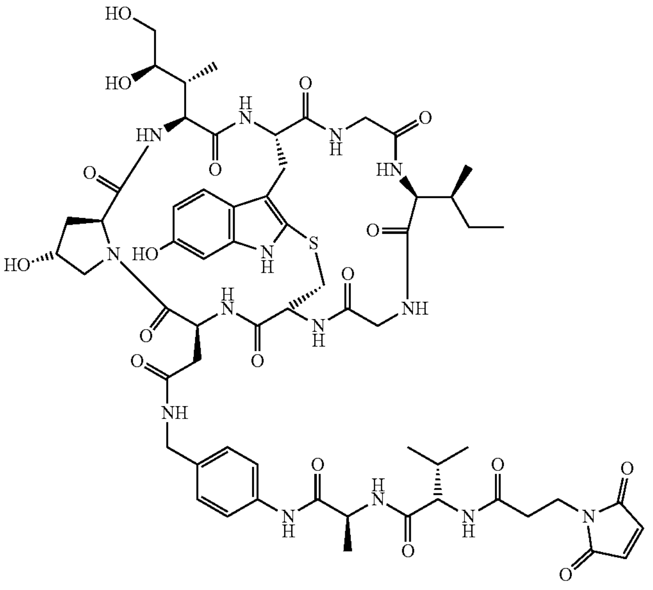 | HDP 30.2347 | 6-OH Trp thioether Linker at aa1 | according to invention |

-continued

| | | | |
|---|---|---|---|
| 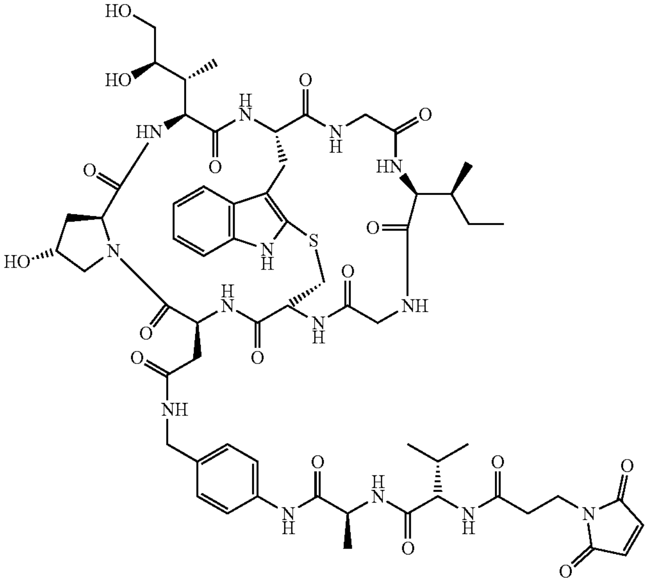 | HDP 30.2115 | Trp thioether Linker at aa1 | not according to invention |
| 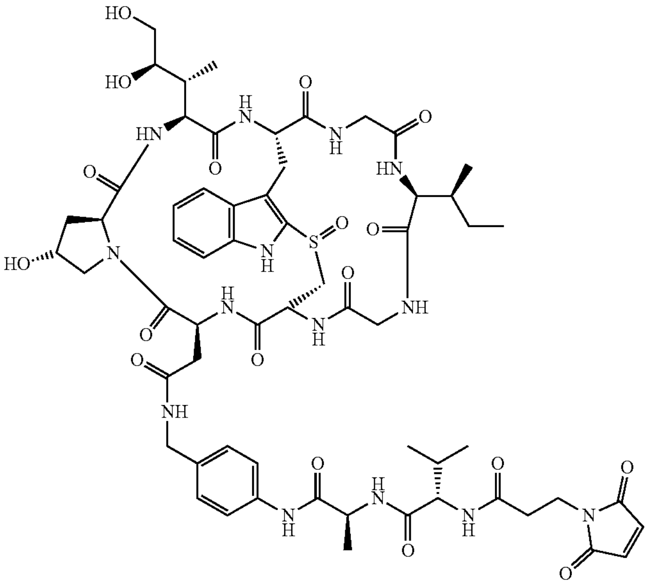 | HDP 30.2183 | Trp sulfoxide Linker at aa1 | not according to invention |

2. Antibodies

The following antibodies were conjugated to the amatoxin linker conjugates

| antibody | target | Format | definition | modification |
|---|---|---|---|---|
| Trastuzumab | Her-1 | IgG | drugbank entry: DB00072 | D265C substitution in both Fc domain. |
| h3/F11 | PSMA | IgG | CDR sequences specified in EP2363486 | D265C substitution in both Fc domain. |
| chiBCE19 | CD19 | IgG | | D265C substitution in both Fc domain |

Trastuzumab and h3/FT 1 have been described above already. chiBCE19 is enablingly disclosed in Liittgau et al 2013.

3. The Conjugation Technology

Antibodies were conjugated to the amatoxin linker conjugates by means of the so-called Thiomab technology. In this approach, the conjugation takes place by conjugation of the maleimide residue of the toxin linker construct to the free SH group of a cysteine residue in the antibody, as shown in the following reaction scheme:

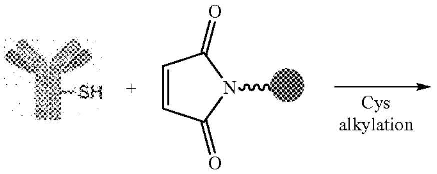

-continued

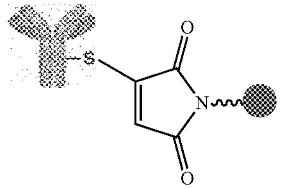

The principles of this conjugation method, are disclosed in Junutula et al (2008), the content of which is incorporated herein by reference.

The antibodies used in the present experiments comprise a D265C substitution in both Fc domains, in order to provide a cystein residue that has such free SH group. The respective technology is disclosed in WO2016142049 A1 assigned to the present applicant, the content of which is incorporated herein by reference, and delivers a homogenous product with a fixed drug to antibody ration ("DAR") of 2 and a site specific conjugation.

3. Assays 3.1. Cell Viability Assay

Cytotoxic activity of anti PSMA and anti-Her2 amatoxin conjugates was evaluated in vitro with target-positive tumor cell lines and the chemiluminescent BrdU incorporation assay (Roche Diagnostics). Cell viability was determined after 96 h incubation with different concentrations of conjugates at 37° C. and 5% $CO_2$ by measurement of fixed and permeabilized cells with an anti-BrdU-HRP antibody in a BMG Labtech Optima microplate reader. $EC_{50}$ value of dose-response curve was calculated by Graphpad Prism 4.0 software.

Cytotoxic activity of anti CD19 amatoxin conjugates on target positive cells was assessed by CellTiter-Glo 2.0 Luminescent Cell Viability Assay (Promega, Madison, WI) in 96-well tissue culture plates. Cell viability was determined after 96 h incubation with different concentrations of conjugates at 37° C. and 5% $CO_2$. Data analysis was performed with GraphPad Prism 7 (GraphPad Software, Inc, La Jolla, CA) software to plot curve fits and perform statistical analyses. Nonlinear variable slope curve-fits were plotted as log[ADC] vs. Response and $EC_{50}$ values were generated.

3.2. Xenografts/Tumor Volume

LnCap xenograft model: Male CB17 SCID mice were inoculated with $2.5\times10^6$ LNCap prostate carcinoma cells per mouse subcutaneously in the right flank. At a mean tumor vol. of ~150 $mm^3$, animals were allocated to groups on day 0. On the same day the animals received a single intravenous dose of amanitin based anti-PSMA antibody drug conjugates (ADCs) Tumor volume and body weight were determined twice per week.

Jimt-1 xenograft model: Female NMRI nude mice were inoculated with $5\times10^6$ Jimt-1 breast cancer cells per mouse subcutaneously in the right flank. At a mean tumor vol. of ~120 $mm^3$, animals were allocated to groups on day 0. On the same day the animals received a single intravenous dose of amanitin based anti-Her2 antibody drug conjugates (ADCs) Tumor volume and body weight were determined twice per week.

Raji xenograft model: Female CB17 SCID mice were inoculated with $2.5\times10^6$ Raji Burkitt's lymphoma cells per mouse subcutaneously in the right flank. At a mean tumor vol. of ~80 $mm^3$, animals were allocated to groups on day 0. On the same day the animals received a single intravenous dose of amanitin based anti-CD19 antibody drug conjugates (ADCs) Tumor volume and body weight were determined twice per week.

Tumor growth was monitored by caliper measurement. Tumor size was calculated according to the equation: volume=$W^2\times L\times 0.5$ (L=length and W=perpendicular width of the tumor, L>W).

3.3. Xenografts/Survival

Intravenous Nalm-6 xenograft model: Female CB17 SCID mice were inoculated with $2.5\times10^6$ Raji Burkitt's lymphoma cells per mouse into the tail vein. Animals were allocated to groups on day 0. On day 3 after tumor cell injection, the animals received a single intravenous dose of amanitin based anti-CD19 antibody drug conjugates (ADCs). Body weight was determined twice per week. Survival was monitored daily.

Intravenous Raji xenograft model: Female CB17 SCID mice were inoculated with $5\times10^6$ Nalm-6 B Cell precursor leukemia cells per mouse into the tail vein. Animals were allocated to groups on day 0. On day 3 after tumor cell injection, the animals received a single intravenous dose of amanitin based anti-CD19 antibody drug conjugates (ADCs). Body weight was determined twice per week. Survival was monitored daily.

3.4. Synthesis of Conjugate chiBCE19-D265C-30.2115

3.4.1. Conjugation of HDP 30.2060 to 10 mg chiBCE19-D265C 10 mg Thiomab chiBCE19-D265C in PBS buffer will be used for conjugation to HDP 30.2060.
- Adjust antibody solution to 1 mM EDTA:
  - 2 ml antibody solution (10.0 mg)+20 μl 100 mM EDTA, pH 8.0
  - Amount antibody: 10 mg=$6.8\times10^{-8}$ mol 3.4.2. Uncapping of Cysteines by Reaction of Antibody with 40 Eq. TCEP:

- 2 ml antibody solution ($6.8\times10^{-8}$ mol)+54.5 μl 50 mM TCEP solution ($2.72\times10^{-6}$ mol)
- Incubate for 3 h at 37° C. on a shaker.
- Two consecutive dialyses at 4° C. in 2.0 l 1×PBS, 1 mM EDTA, pH 7.4 in a Slide-A-Lyzer Dialysis Cassette 20,000 MWCO, first dialysis ca. 4 h, second dialysis overnight
- Concentrate to ca. 4.0 ml using Amicon Ultra Centrifugal Filters 50'000 MWCO.

3.4.3. Oxidation by Reaction of Antibody with 20 Eq. Dehydroascorbic Acid (dhAA):

- ca. 2 ml antibody solution ($6.8\times10^{-8}$ mol)+27.2 μl fresh 50 mM dhAA solution ($1.36\times10^{-6}$ mol)
- Incubate for 3 h at RT on a shaker.

3.4.4. Conjugation with Amanitin Using 6 Eq. HDP 30.2060 and Quenching with 25 Eq. N-Acetyl-L-Cysteine:

- Solubilize 0.7 mg HDP 30.2060 in 70 μl DMSO=10 μg/μl
  - ca. 2 ml antibody solution (=9.5 mg; $6.46\times10^{-8}$ mol)+ 50.9 μl HDP 30.2060 (=509 μg; $3.88\times10^{-7}$ mol).
  - Incubate 1 h at RT.
  - Quench by addition of 16 μl 100 mM N-acetyl-L-cysteine ($1.62\times10^{-6}$ mol).
  - Incubate 15 min at RT (or overnight at 4° C.).
  - Purify each reaction mix with PD-10 columns equilibrated with 1×PBS, pH 7.4. Identify protein-containing fractions with Bradford reagent on parafilm and bring protein-containing fractions together.
  - Dialysis of each antibody solution at 4° C. overnight in 2.0 I PBS, pH 7.4 and Slide-A-Lyzer Dialysis Cassettes 20'000 MWCO.

3.4.5. Determination of protein concentration and drug-antibody ratio (DAR) by UV-spectra (absorption at 280 nm and 310 nm) using naked antibody vs. ADC adjusted to identical protein concentrations.

3.4.6. Adjust protein concentration to 5.0 mg/ml ($3.4\times 10^{-5}$ M) and bring to sterile conditions by filtration. Store at 4° C.

4. Cell Lines

The following cell lines were used

| Her2 positive | PSMA positive | CD19 positive |
|---|---|---|
| JIMT-1 | LNCaP | Raji |
| SKBR-3 | 22RV1 | RajiLuc |
| BT474 | MDA-PCa2b | Nalm-6 |
| NCI-N87 | C4.2 | MEC-2 |

The cell lines used are derived from solid tumors, with the exception of the Raji, Nalm-6 and MEC-2 cell lines, whereas Raji is the first continuous human cell line from hematopoietic origin. It is extremely important to understand that Raji cells, which are CD19 positive, when injected into mice i.v., develop a leukemia phenotype, while when injected into mice s.c., develop a solid tumor phenotype.

Results

1. Toxin-Linker Constructs Conjugated to Trastuzumab

A cell viability assay was used with JIMT-1 cells treated with the toxin-linker constructs discussed above, conjugated to Trastuzumab (drugbank entry: DB00072), which had a D265C substitution in the Fc domain. JIMT-1 is a solid cancer cell line derived from a breast ductal adenocarcinoma. Results are shown in FIG. 1

The 6'-Hydroxy-Trp variants (where $R_4$ of formula (i) is H or a linker which carries a reactive group Y for linking said amatoxin to a target-binding moiety) 30.1699, 30.2371, 30.2060 and 30.2347 show comparable potency, while the Trp variant 30.2115 shows a slightly decreased potency, and the Trp variant 30.2183 shows a strongly decreased potency.

The experiments shown in FIG. 1 were repeated with three other cancer cell lines derived from solid tumors, all expressing different degrees of HER2 (SKBR-3, BT474 and NCI-N87). Almost the same pattern was observed over all cell lines.

In all cases, the 6'-Hydroxy-Trp variants (where $R_4$ of formula (i) is H or a linker which carries a reactive group Y for linking said amatoxin to a target-binding moiety) showed higher cytotoxic potential than the Trp variants (where position 6 in the Trp residue of the amanitin is substituted with a H residue).

TABLE 2

| EC50 values [M] of the conjugates on the different cell lines | | | | | |
|---|---|---|---|---|---|
| Conjugate | Characteristics | *JIMT-1* | *SKBR-3* | *BT474* | *NCI-N87* |
| T-D265C-30.1699 | SO; 6-OH-W; AA4 | $1.8\times 10^{-10}$ | $9.9\times 10^{-12}$ | $6.8\times 10^{-11}$ | $1.2\times 10^{-11}$ |
| T-D265C-30.2371 | S; 6-OH-W; AA4 | 7.2 × 10–11 | 1.6 × 10–12 | 4.6 × 10–11 | 9.5 × 10–12 |
| T-D265C-30.2060 | SO; 6-OH-W; AA1 | $1.9\times 10^{-10}$ (10%) | $2.6\times 10^{-11}$ | $1.1\times 10^{-10}$ | $1.6\times 10^{-11}$ |
| T-D265C-30.2347 | S; 6-OH-W; AA1 | $1.6\times 10^{-10}$ | $7.9\times 10^{-12}$ | $6.4\times 10^{-11}$ | $3.7\times 10^{-11}$ |
| T-D265C-30.2115 | S; W; AA1 | $1.5\times 10^{-10}$ (25%) | $5.8\times 10^{-12}$ | $5.6\times 10^{-11}$ | $5.1\times 10^{-11}$ |

TABLE 2-continued

| EC50 values [M] of the conjugates on the different cell lines | | | | | |
|---|---|---|---|---|---|
| Conjugate | Characteristics | *JIMT-1* | *SKBR-3* | *BT474* | *NCI-N87* |
| T-D265C-30.2183 | SO; W; AA1 | nfb | *4.2 × 10 −11* | *4.2 × 10−10* | *2.4 × 10−10* |

Figure 2A:
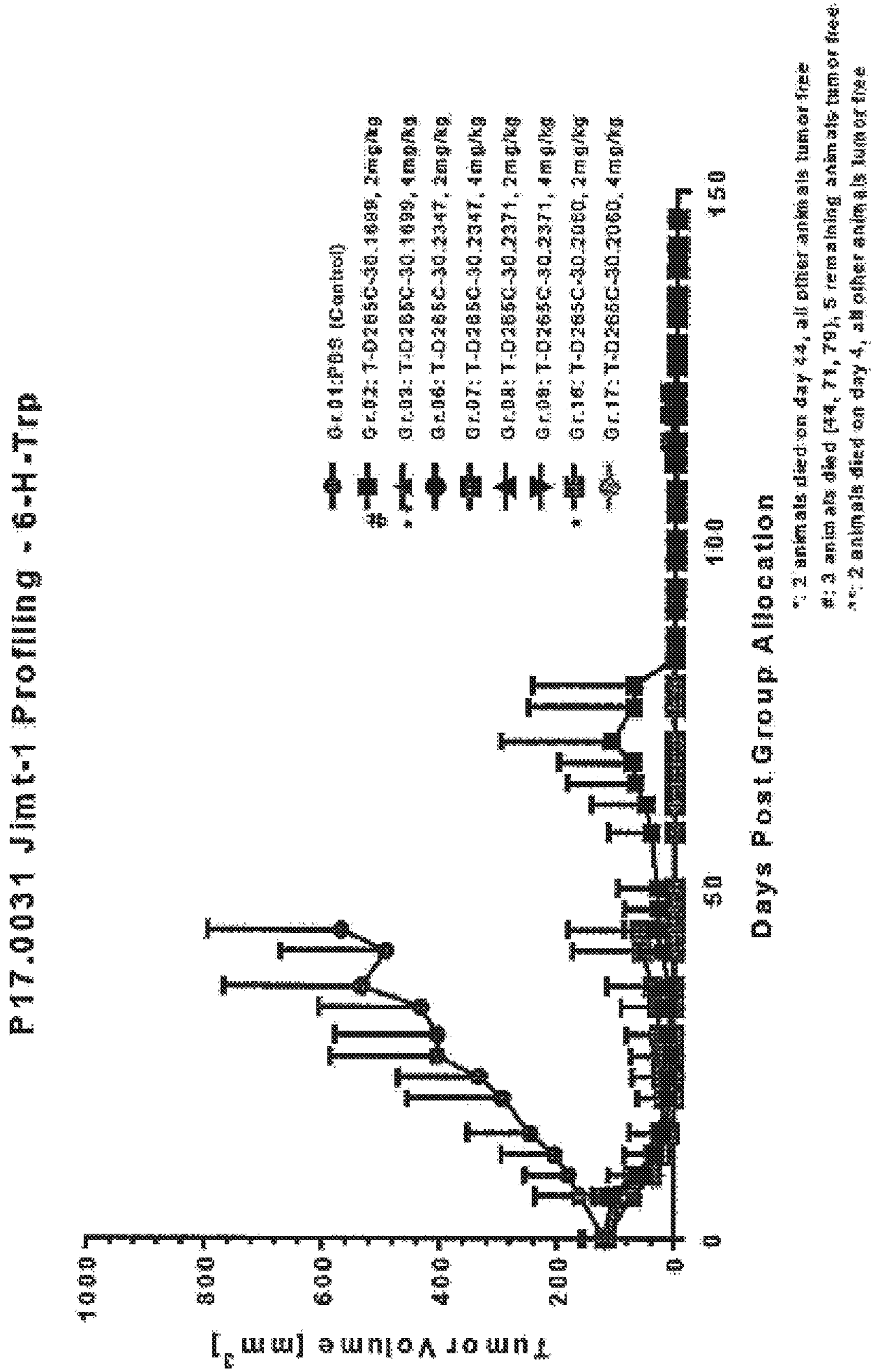

Bold print: highest cytotoxic potential;
italics: lowest cytotoxic potential.
"SO" means $R_5$ according to the amanitin of formula (i) = O,
"S" means $R_5$ according to the amanitin of formula (i) is absent,
"6-OH-W" refers to the embodiment shown in formula (i) with $OR_4$,
"W" refers to an embodiment which is not in accordance with the invention where position 6 in the Trp residue of the amanitin is substituted with a H residue, and "AA4/AA1" mean the Amino Acid residue in the amanitin to which the linker is conjugated.
"Ngh" means: no full-blown cytotoxic potential with >50% residual cell viability Growth inhibition experiments were then carried out with tumor xenografts of JIMT cells, which were then treated with the toxin-linker constructs discussed above, conjugated to Trastuzumab (drugbank entry: DB00072), which had a D265C substitution in the Fc domain. Results are shown in FIG. 2.

Figure 2B:
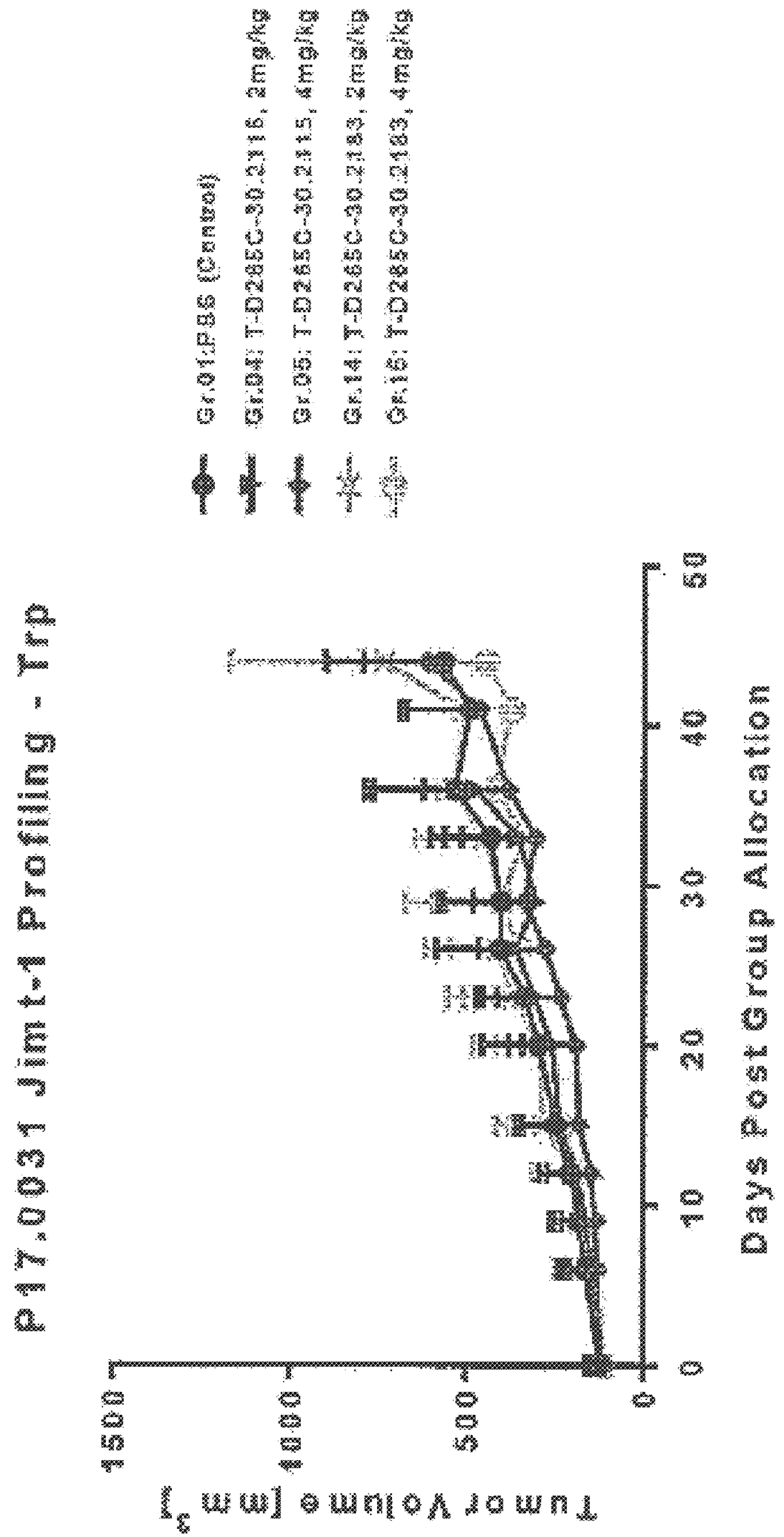

The 6'-Hydroxy-Trp variants (where $R_4$ of formula (i) is H or a linker which carries a reactive group Y for linking said amatoxin to a target-binding moiety) 30.1699, 30.2371, 30.2060 and 30.2347 show strong tumor shrinking activity (FIG. 2A), while the Trp variants 30.2115 and 30.2183 show a significantly decreased tumor shrinking activity (FIG. 2B).

2. Toxin-Linker Constructs Conjugated to an Anti-PSMA Antibody

A cell viability assay was used with LNCaP cells treated with the toxin-linker constructs discussed above, conjugated to the anti-PSMA antibody h3/FTT, which had a D265C substitution in the Fc domain. LNCaP is a solid prostate adenocarcinoma cell line derived from a left supraclavicular lymph node metastasis. Results are shown in FIG. 3

The 6'-Hydroxy-Trp variants (where $R_4$ of formula (i) is H or a linker which carries a reactive group Y for linking said amatoxin to a target-binding moiety) 30.1699, 30.2371, 30.2060 and 30.2347 show comparable potency, while the Trp variants 30.2115 and 30.2183 show a strongly decreased potency.

Figure 3:
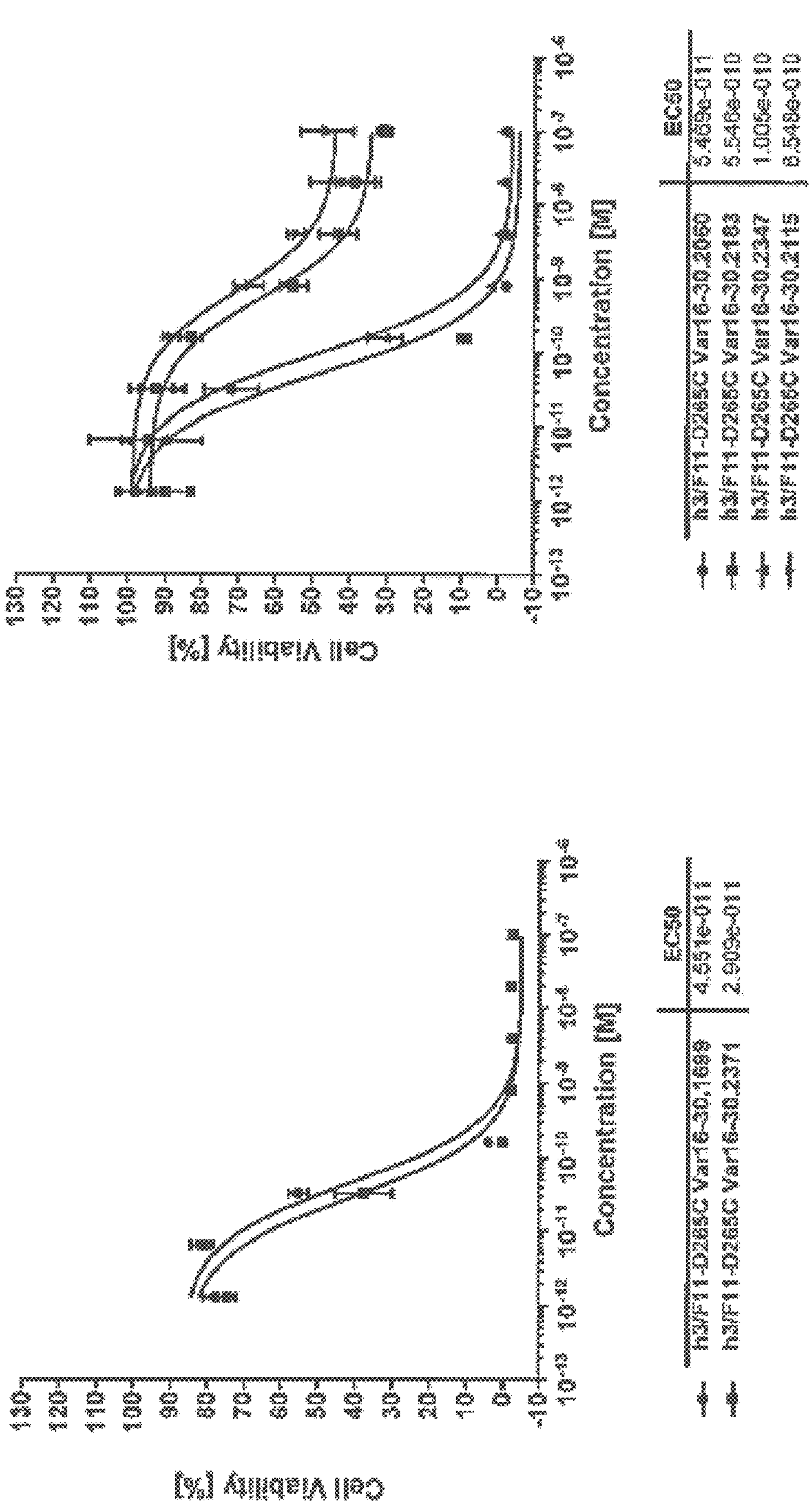

The experiments shown in FIG. 3 were repeated with three other solid cancer cell lines, all expressing different degrees of PSMA (22RV1, MDA-PCa2b, and C4.2). Almost the same pattern was observed over all cell lines.

In all cases, the 6'-Hydroxy-Trp variants (where $R_4$ of formula (i) is H or a linker which carries a reactive group Y for linking said amatoxin to a target-binding moiety) slightly higher cytotoxic potential than the Trp variants (where position 6 in the Trp residue of the amanitin is substituted with a H residue).

TABLE 3

| EC50values [M] of the conjugates on the different cell lines | | | | | |
|---|---|---|---|---|---|
| Conjugate | Characteristics | LNCaP | 22RV1 | MDA-PCa2b | C4.2 |
| h3/F11-D265C 30.1699 | SO; 6-OH-W; AA4 | $4.6\times 10^{-11}$ | $1.1\times 10^{-10}$ | $1.6\times 10^{-10}$ | $4.3\times 10^{-11}$ |
| h3/F11-1D265C 30.2371 | S; 6-OH-W; AA4 | 2.9 × 10–11 | 3.9 × 10–11 | 2.6 × 10–11 | 3.9 × 10–11 |
| h3/F11-1D265C 30.2060 | SO; 6-OH-W; AA1 | $5.5\times 10^{-11}$ | $2.4\times 10^{-10}$ (15%) | $8.5\times 10^{-11}$ | $6.8\times 10^{-11}$ |

TABLE 3-continued

| EC50values [M] of the conjugates on the different cell lines | | | | | |
|---|---|---|---|---|---|
| Conjugate | Characteristics | LNCaP | 22RV1 | MDA-PCa2b | C4.2 |
| h3/F11-1D265C Var16-30.2347 | S; 6-OH-W; AA1 | $1.0 \times 10^{-10}$ | $8.2 \times 10^{-11}$ (10%) | $4.5 \times 10^{-11}$ | $8.2 \times 10^{-11}$ |
| h3/F11-1D265C Var16-30.2115 | S; W; AA1 | *6.5 × 10–10 (50%)* | $1.5 \times 10^{-10}$ (25%) | $6.3 \times 10^{-11}$ | $5.6 \times 10^{-10}$ (25%) |
| h3/F11-1D265C Var16-30.2183 | SO; W; AA1 | $5.5 \times 10^{-10}$ (40%) | *3.6 × 10–10 (35%)* | *3.6 × 10–10* | *nfb* |

Bold print: highest cytotoxic potential;
italics: lowest cytotoxic potential.
"SO" means $R_5$ according to the amanitin of formula (i) = 0,
"S" means $R_5$ according to the amanitin of formula (i) is absent,
"6-OH-W" refers to the embodiment shown in formula (i) with $OR_4$,
"W" refers to an embodiment which is not in accordance with the invention where position 6 in the Trp residue of the amanitin is substituted with a H residue, and
"AA4/AA1" mean the Amino Acid residue in the amanitin to which the linker is conjugated.
"Nfb" means: no full-blown cytotoxic potential with >50% residual cell viability.
(X%) means residual viability.

Figure 4A:
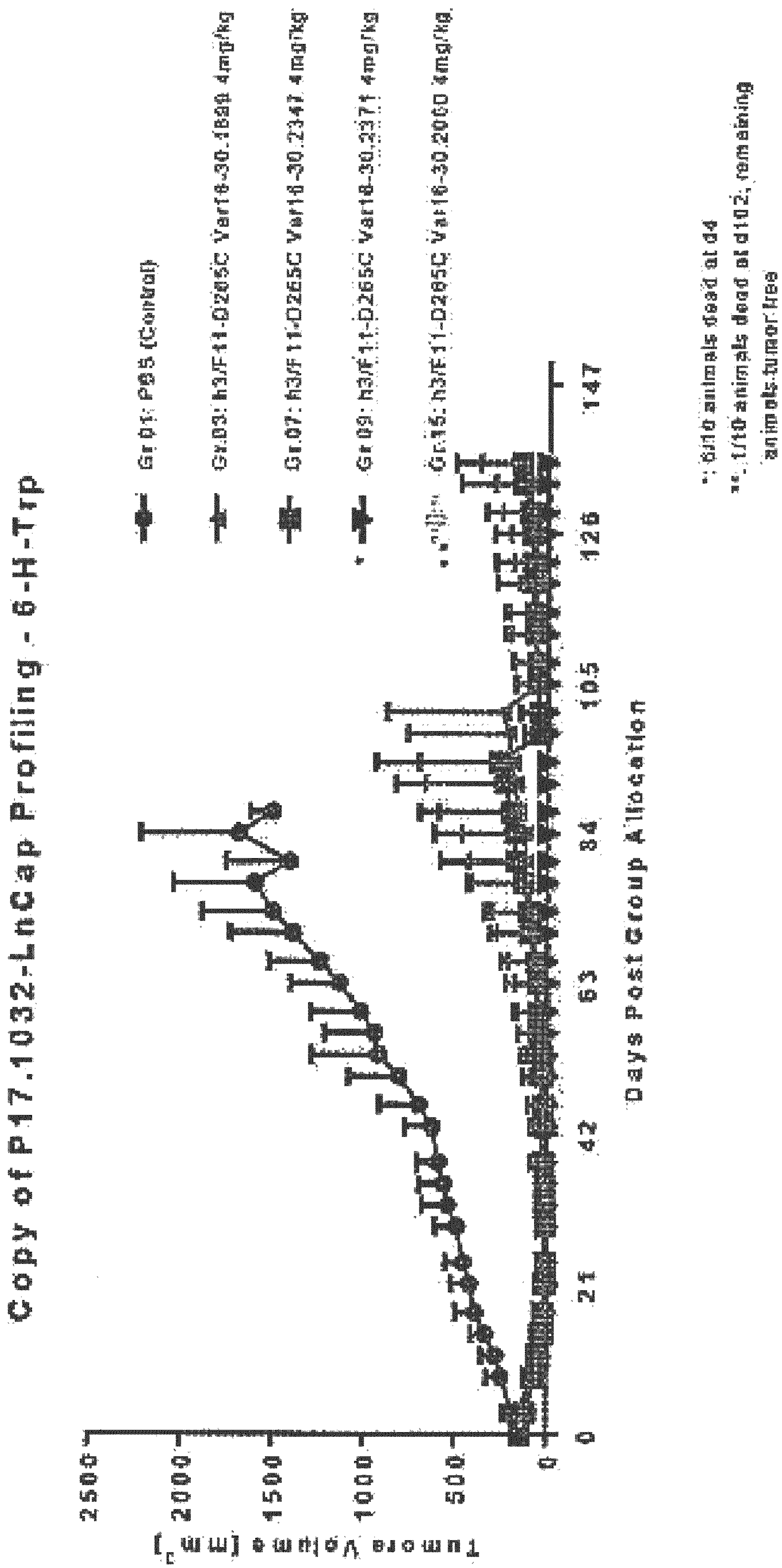
Figure 4B:
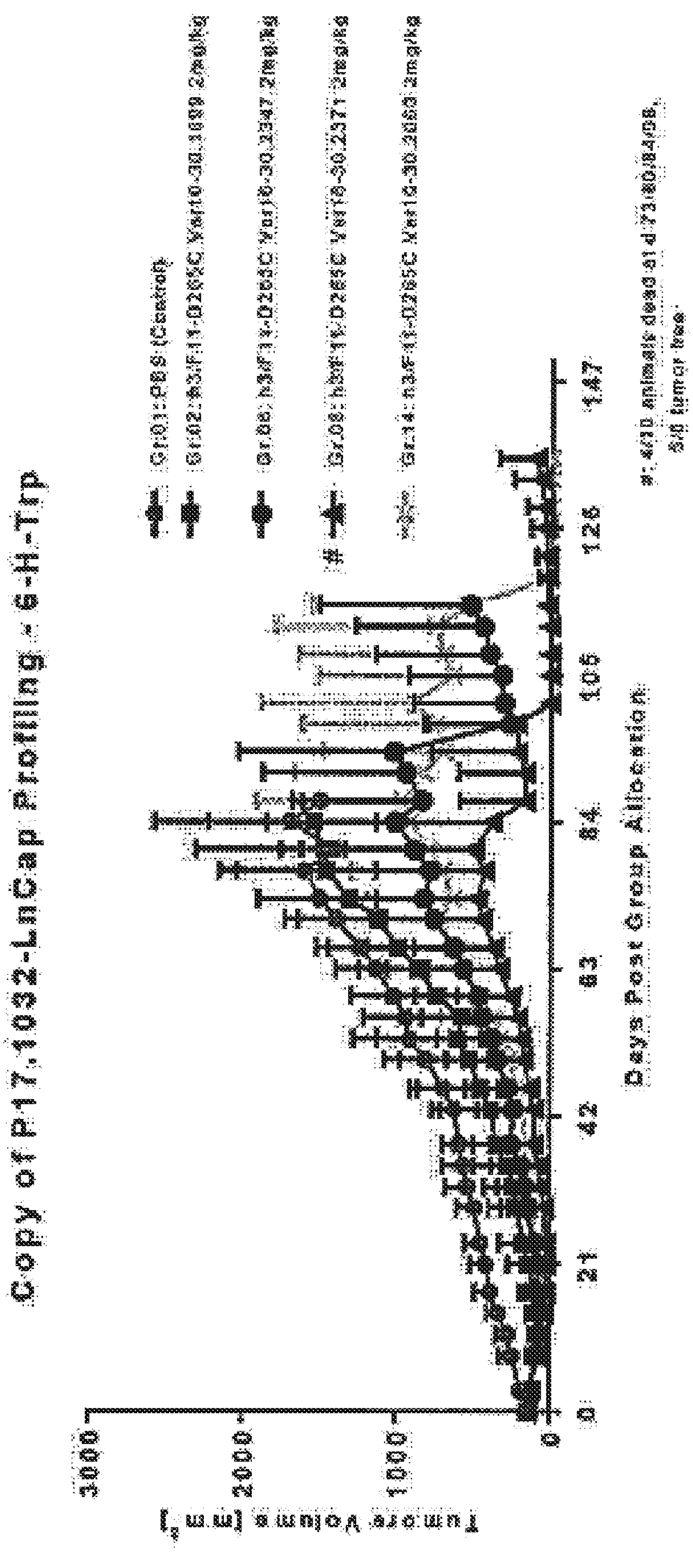

Growth inhibition experiments were then carried out with tumor xenografts of LnCap cells, which were treated with the toxin-linker constructs discussed above, conjugated to the anti-PSMA antibody h3/F1, which had a D265C substitution in the Fc domain. Results are shown in FIG. 4.

Figure 4C:
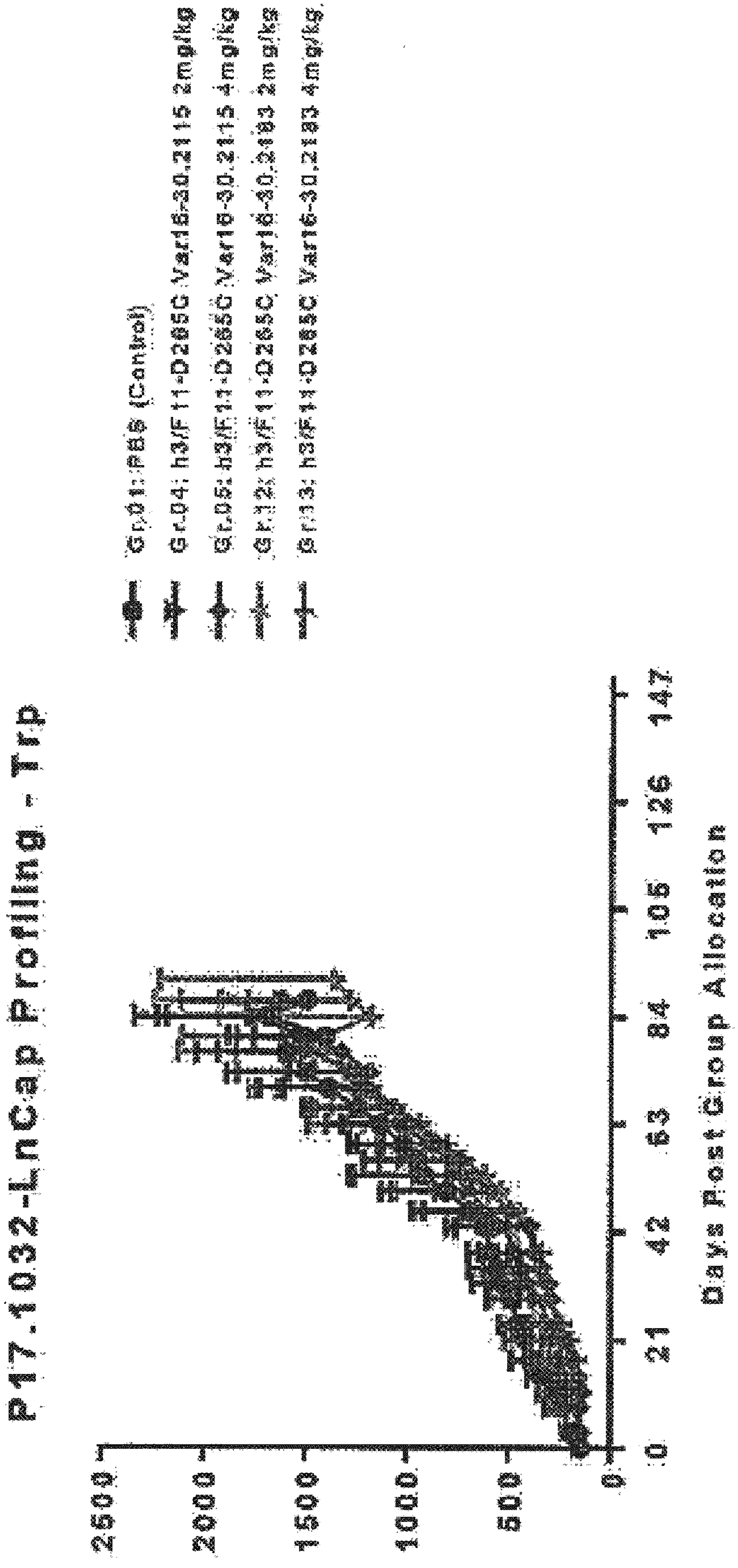

The 6'-Hydroxy-Trp variants (where $R_4$ of formula (i) is H or a linker which carries a reactive group Y for linking said amatoxin to a target-binding moiety) 30.1699, 30.2371, 30.2060 and 30.2347 show strong tumor shrinking activity (FIG. 4A, B), while the Trp variants 30.2115 and 30.2183 show a significantly decreased tumor shrinking activity (FIG. 4C).

3. Toxin-Linker Constructs Conjugated to an antiCD19 Antibody

A cell viability assay was used with Raji cells treated with the toxin-linker constructs discussed above, conjugated to the antiCD19 antibody chiBCE19, which had a D265C substitution in the Fc domain. Raji is a cell line derived from Burkitt's lymphoma.

In this case both, the 6'-Hydroxy-Trp variants (where $R_4$ of formula (i) is H or a linker which carries a reactive group Y for linking said amatoxin to a target-binding moiety) 30.1699, 30.2371, 30.2060 and 30.2347 and the Trp variants 30.2115 and 30.2183 show comparable potency.

Figure 5:
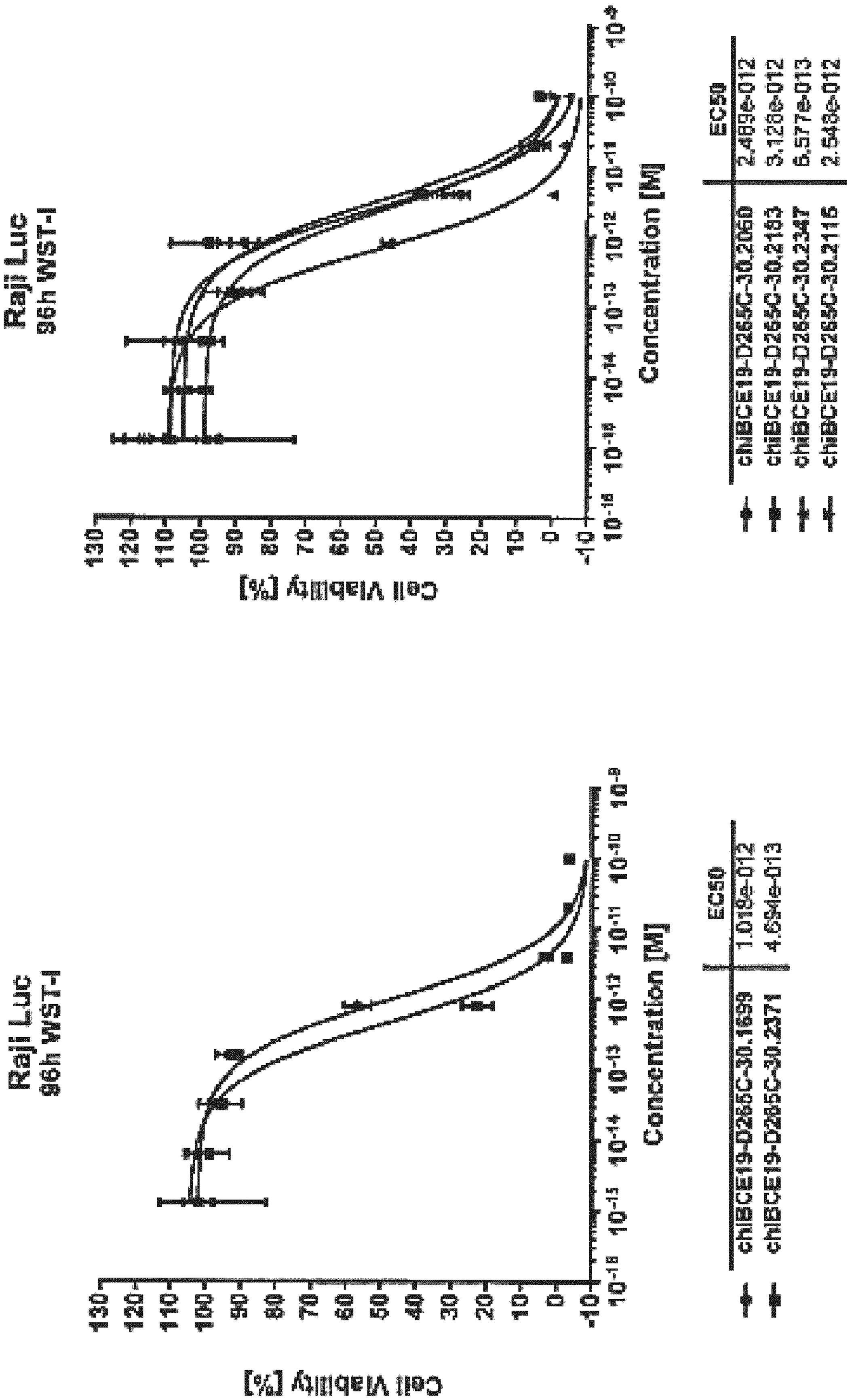

The experiments shown in FIG. 5 were repeated with two other cancer cell lines, all expressing different degrees of CD19 (Raji-Luc and MEC-2). Almost the same pattern was observed over all cell lines.

In all cases, the 6'-Hydroxy-Trp variants (where $R_4$ of formula (i) is H or a linker which carries a reactive group Y for linking said amatoxin to a target-binding moiety) shows comparable cytotoxic potential as the Trp variants (where position 6 in the Trp residue of the amanitin is substituted with a H residue).

TABLE 4

| EC50value [M] of the conjugates on the different cell lines | | | | |
|---|---|---|---|---|
| Conjugate | Characteristics | Raji | Raji-Luc | MEC-2 |
| chiBCE19-D265C-30.1699 | SO; 6-OH-W; AA4 | $2.9 \times 10^{-12}$ | $1.0 \times 10^{-12}$ | $1.1 \times 10^{-11}$ |
| chiBCE19-D265C-30.2371 | S; 6-OH-W; AA4 | 1.9 × 10–12 | 4.7 × 10–13 | 2.9 × 10–12 |
| chiBCE19-D265C-30.2060 | SO; 6-OH-W; AA1 | $2.5 \times 10^{-11}$ | $2.5 \times 10^{-12}$ | $3.4 \times 10^{-11}$ (20%) |
| chiBCE19-D265C-30.2347 | S; 6-OH-W; AA1 | $8.2 \times 10^{-12}$ | $6.6 \times 10^{-13}$ | $1.6 \times 10^{-11}$ (10%) |
| chiBCE19-D265C-30.2115 | S; W; AA1 | $4.2 \times 10^{-11}$ | $2.5 \times 10^{-12}$ | $2.7 \times 10^{-11}$ (20%) |
| chiBCE19-D265C-30.2183 | SO; W; AA1 | *2.6 × 10–11 (30%)* | *3.1 × 10–12* | *8.6 × 10–11 (30%)* |

Bold print highest cytotoxic potential;
italics: lowest cytotoxic potential.
"SO" means $R_5$ according to the amanitin of formula (i) = of formula (i) is 0,
"S" means $R_5$ according to the amanitin absent,
"6-OH-W" refers to formula (i) with $OR_4$,
"W" refers to an the embodiment shown in embodiment which is not in accordance with the invention where position 6 in the Trp residue of the amanitin is substituted with a H residue, and
"AA4/AA1" mean the Amino Acid residue in the amanitin to which the linker is conjugated.
"Nfb" means: no full-blown cytotoxic potential with >50% residual cell viability.
(X%) means residual viability.

Survival rates were then investigated with tumor xenografts of Raji cells (with or without transfected luciferase) or Nalm-6 cells obtained by i.v. administration of the respective cells.

Figure 6A:
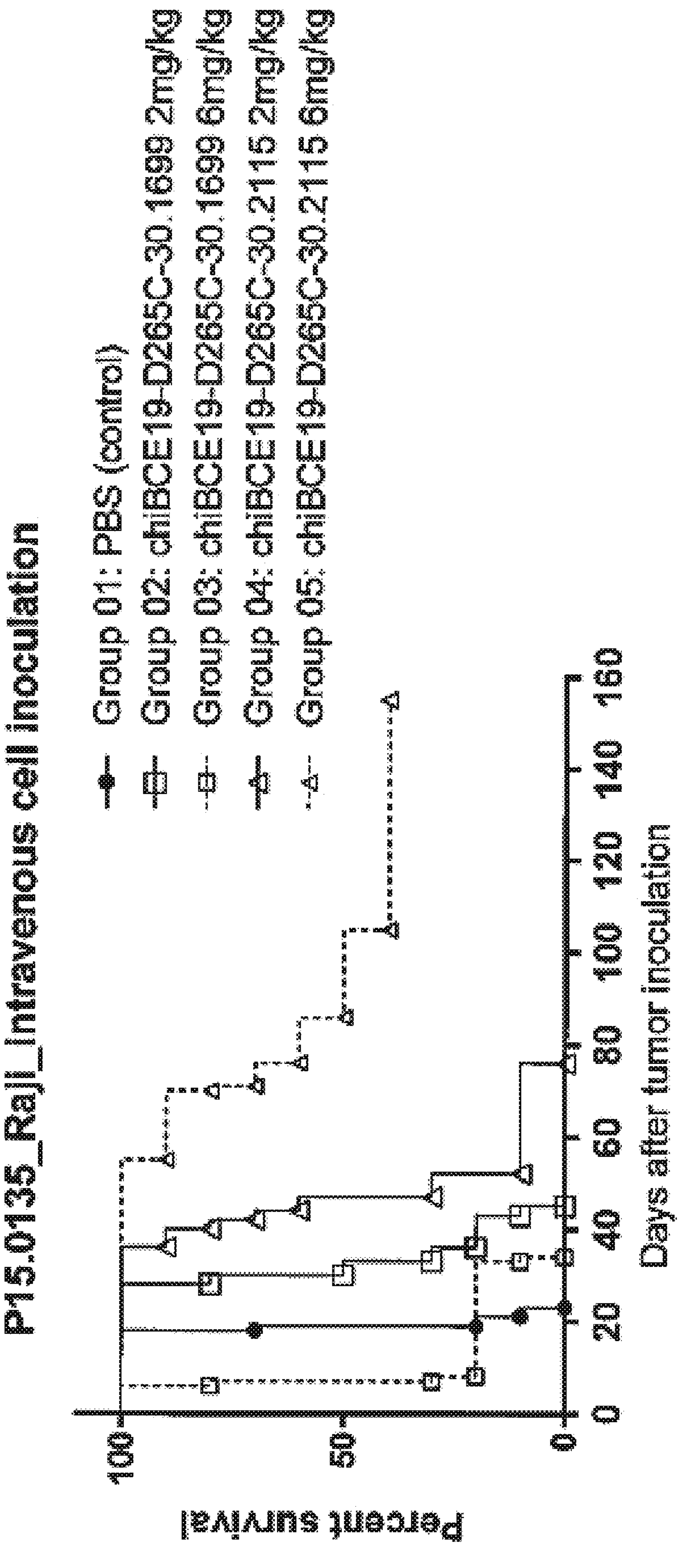
Figure 6B:
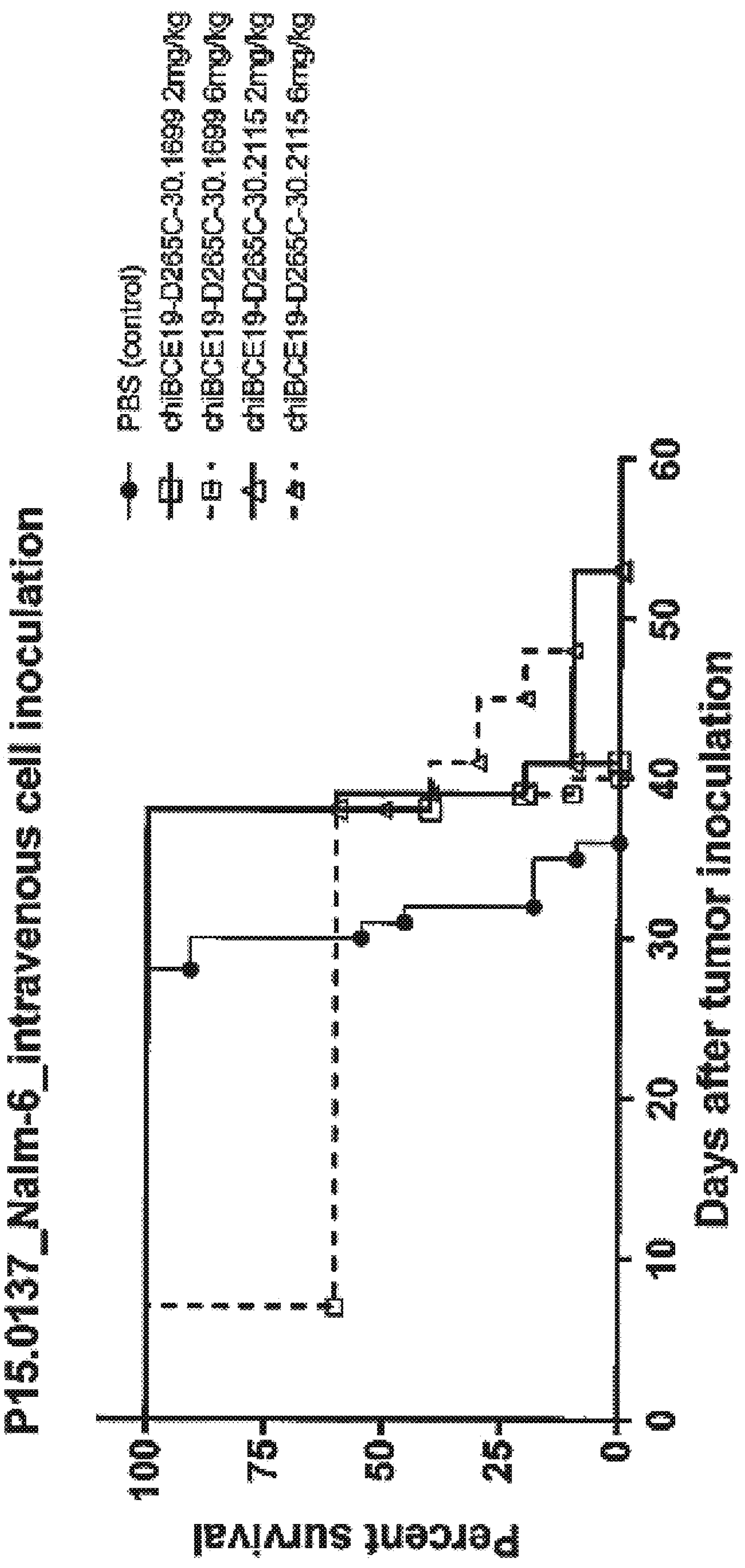

The mice were then treated with a single i.v. dose of the toxin-linker constructs discussed above, conjugated to the antiCD19 antibody chiBCE19, which had a D265C substitution in the Fc domain. Raji is a cell line derived from Burkitt's lymphoma, Nalm-6 is a cell line derived from acute lymphoblastic leukemia (ALL). Results are shown in the Kaplan Meier curves of FIG. 6.

When administered i.v., Raji as well as Nalm-6 cells develop a phenotype that mimics that of a leukemia, i.e., a liquid tumor, while, when administered s.c., only Raji cells develop a phenotype that mimics that of a solid tumor, while Nalm-6 cells still develop a liquid tumor.

Survival experiments were carried out with i.v. injected Raji Luc (FIG. 6A) or NALM6 (FIG. 6B) cells. In all cases, it turned out that the variant which has the 6-OH Trp (30.1699) has lower potency than the Trp variant 30.2115.

Growth inhibition experiments were then carried out with tumor xenografts of Raji cells injected into mice s.c. This approach leads to tumors that mimic the phenotype of a solid tumor. Treatment was done with the toxin-linker constructs discussed above, conjugated to the antiCD19 antibody chiBCE19, which had a D265C substitution in the Fc domain.

Figure 7A:
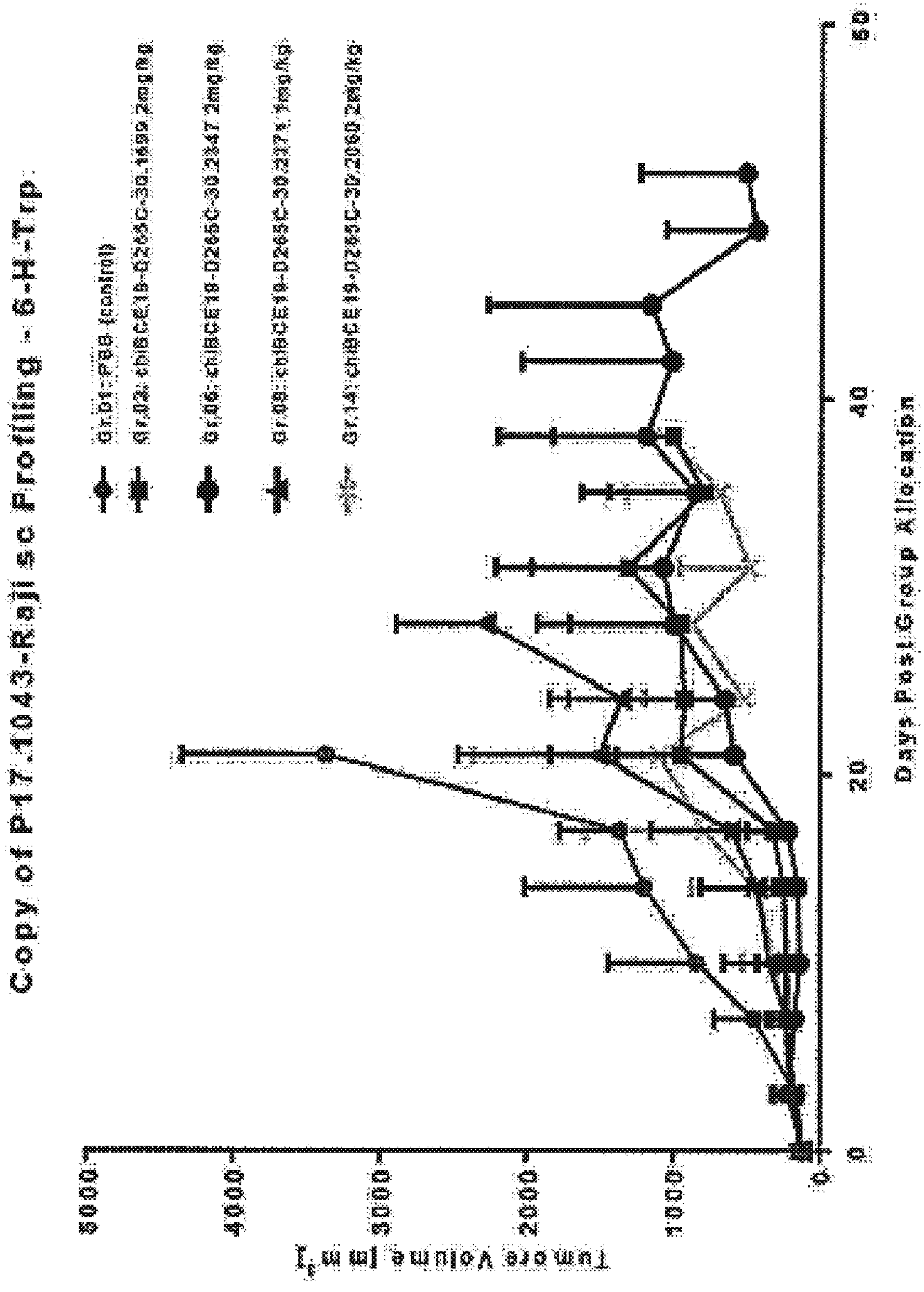
Figure 7B:
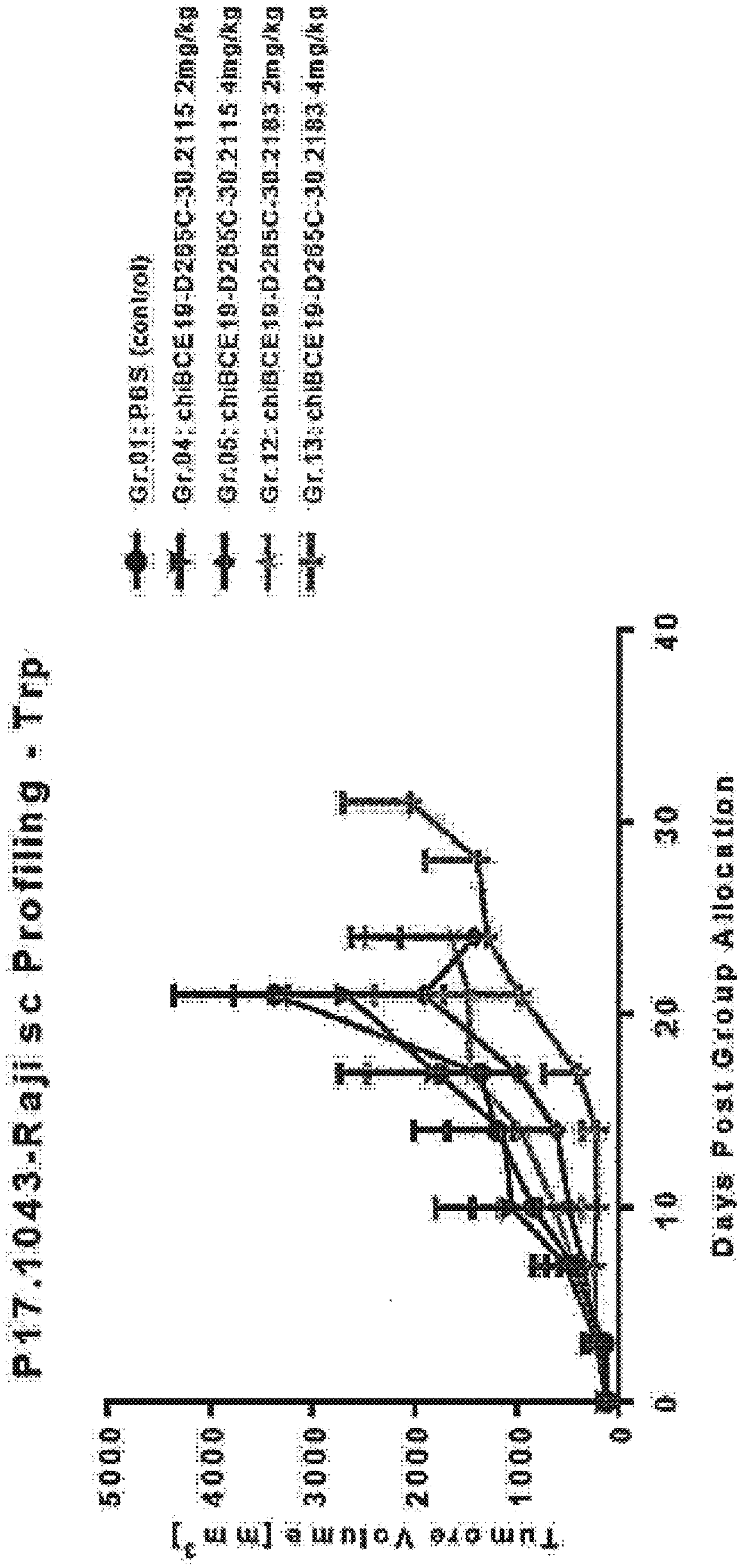

The 6'-Hydroxy-Trp variants (where $R_4$ of formula (i) is H or a linker which carries a reactive group Y for linking said amatoxin to a target-binding moiety) 30.1699, 30.2371, 30.2060 and 30.2347 show strong tumor shrinking activity (FIG. 7A), while the Trp variants 30.2115 and 30.2183 show a significantly decreased tumor shrinking activity (FIG. 7B).

| amatoxin linker Conjugate | Efficacy JIMT-1 | MTD HER2 mice mg/kg | Efficacy LnCap | MTD PSMA mice mg/kg | Efficacy Raji-Luc iv | Efficacy Raji i.v. | Efficacy Nalm-6 i.v. | Efficacy Raji sc | MTD CD19 mice mg/kg | HNSTD DIG Cyno mg/kg |
|---|---|---|---|---|---|---|---|---|---|---|
| 30.1699 | ++ | 2 | + | 4 | + | + | + | ○ | 4 | >3 |
| 30.2371 | ++ | 4 | ++ | 2 | ++ | -- | -- | ○ | 2 | >2 |
| 30.2060 | ++ | >10 | + | >10 | + | -- | -- | ○ | >10 | <7.5 |
| 30.2347 | ++ | 4 | + | 4 | ++ | -- | -- | ○ | 6 | <5 |
| 30.2115* | -- | 6 | -- | >10 | + | ++ | + | -- | >10 | <7.5 |
| 30.2183* | -- | >10 | -- | >10 | + | -- | -- | -- | >10 | |

*Amatoxin linker constructs not according to the invention.
MTD: maximum tolerated Dose,
HNSTD: highest non-severely toxic dose,
Cyno: Cynomolgus monkey,
DIG: Digoxigenin antibody which does not cross react with hosts targets

REFERENCES

Junutula et al., Nat. Biotechnol. 26 (8),925-932 (2008)
Lüttgau et al., Antibodies (2013) 2, 338-352

What is claimed is:

1. An amatoxin-linker construct for use in the manufacture of a binding moiety-toxin conjugate for the treatment of a solid tumor, wherein the amatoxin-linker construct has a formula selected from the group consisting of:

a)

HDP 30.2347

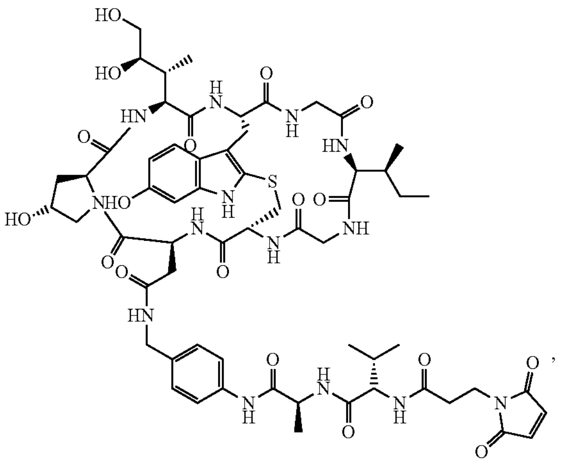

and

-continued b)

HDP 30.2371

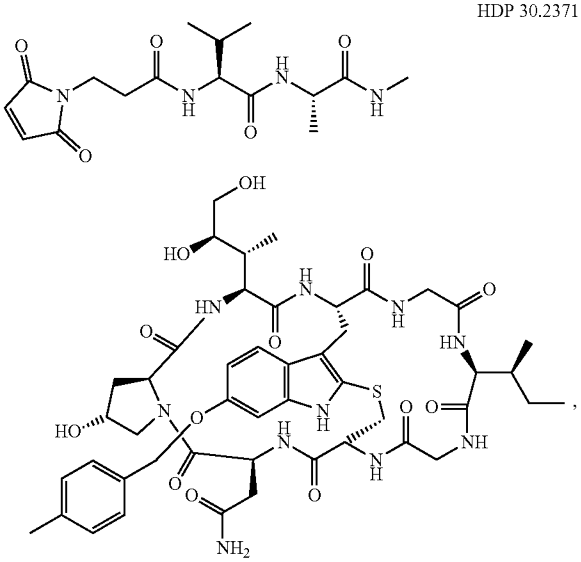

and wherein said solid tumor is resistant to a binding moiety-toxin conjugate whose amatoxin according to formula (I) does not comprise an —$OR_4$ substituent at 6'-position of the indol, wherein formula (I) is defined as formula I

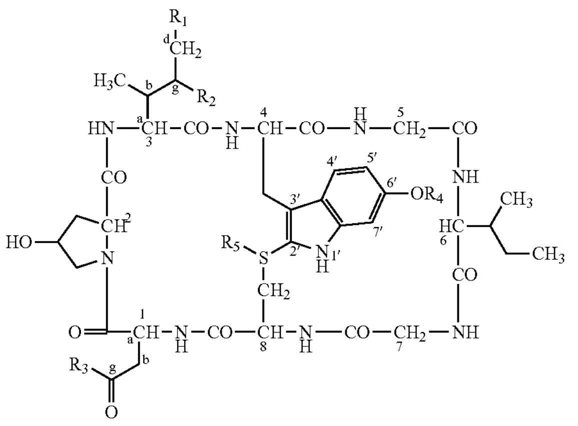

R1 and R2 are each —OH
R3 is NH2, or a linker which carries a reactive group Y for linking said amatoxin to a target-binding moiety,
R4 is H or a linker which carries a reactive group Y for linking said amatoxin to a target-binding moiety,
R5 is absent or =O,
wherein R3 and R4 cannot be the same, and
wherein the target-binding moiety is an antibody, antibody fragment, antibody-based binding protein, or an antibody mimetic, all of which retain target binding properties.

2. A binding moiety-toxin conjugate for use in the treatment of a human or animal subject being (i) diagnosed for, (ii) suffering from or (iii) being at risk of developing a solid tumor, which conjugate comprises (a) the amatoxin-linker construct of claim 1, and (b) a target-binding moiety; and wherein the linker links said amatoxin and said target-binding moiety.

3. The conjugate for use according to claim 2, wherein said target-binding moiety binds at least one target selected from the group consisting of Her2, and/or PSMA.

4. The conjugate for use according to claim 2, wherein the solid tumor is at least one selected from the group consisting of (a) sarcoma, (b) blastoma, and/or (c) carcinoma.

5. The conjugate for use according to claim 2, wherein said target-binding moiety comprises an antibody or fragment or a derivative thereof which comprises an engineered cysteine residue.

6. The conjugate for use according to claim 5, wherein said cysteine residue is selected from the group consisting of heavy chain 118Cys, heavy chain 239Cys, and heavy chain 265Cys, according to the EU numbering system.

7. A pharmaceutical composition for use in the treatment of a human or animal subject being (i) diagnosed for, (ii) suffering from or (iii) being at risk of developing a solid tumor, which composition comprises the conjugate of claim 2.

* * * * *